United States Patent
Lee et al.

(10) Patent No.: US 10,518,859 B2
(45) Date of Patent: Dec. 31, 2019

(54) SYSTEM AND METHOD FOR TREATING BOIL-OFF GAS IN SHIP

(71) Applicant: DAEWOO SHIPBUILDING & MARINE ENGINEERING CO., LTD., Seoul (KR)

(72) Inventors: Joon Chae Lee, Daegu (KR); Dong Kyu Choi, Seongnam-si (KR); Young Sik Moon, Gwangmyeong-si (KR); Seung Kyo Jung, Seoul (KR); Je Heon Jung, Seoul (KR)

(73) Assignee: Daewoo Shipbuilding & Marine Engineering Co., Ltd., Seoul (KR)

( * ) Notice: Subject to any disclaimer, the term of this patent is extended or adjusted under 35 U.S.C. 154(b) by 822 days.

(21) Appl. No.: 14/895,201

(22) PCT Filed: Jun. 26, 2014

(86) PCT No.: PCT/KR2014/005672
§ 371 (c)(1),
(2) Date: Dec. 1, 2015

(87) PCT Pub. No.: WO2014/209029
PCT Pub. Date: Dec. 31, 2014

(65) Prior Publication Data
US 2016/0114876 A1     Apr. 28, 2016

(30) Foreign Application Priority Data

Jun. 26, 2013  (KR) .......................... 10-2013-0073731
Oct. 15, 2013  (KR) .......................... 10-2013-0122494
Mar. 24, 2014  (KR) .......................... 10-2014-0033792

(51) Int. Cl.
*B63H 21/38*     (2006.01)
*F25J 1/00*       (2006.01)
(Continued)

(52) U.S. Cl.
CPC ............. *B63H 21/38* (2013.01); *B63B 25/16* (2013.01); *F02C 3/22* (2013.01); *F02M 21/06* (2013.01);
(Continued)

(58) Field of Classification Search
CPC ............. F17C 2265/033; F17C 2265/05; F25J 1/0025; F25J 1/0032; F25J 1/004
See application file for complete search history.

(56) References Cited

U.S. PATENT DOCUMENTS 2,959,020 A    11/1960  Knapp
3,857,245 A    12/1974  Jones
(Continued)

FOREIGN PATENT DOCUMENTS

CN    102084114 A    6/2011
CN    103080525 A    5/2013
(Continued)

OTHER PUBLICATIONS

International Search Report dated Sep. 29, 2014 of PCT/KR2014/005672 which is the parent application and its English translation—6 pages.
(Continued)

*Primary Examiner* — Tareq Alosh
(74) *Attorney, Agent, or Firm* — Knobbe Martens Olson & Bear LLP

(57) ABSTRACT

In a BOG treatment system, boil-off gas (BOG) discharged from a storage tank is compressed, most of the BOG is used as the fuel of vessel engines, and a remaining part of the BOG is liquefied by cold energy of BOG newly discharged from the storage tank and is returned to the storage tank, thereby efficiently utilizing the BOG. The BOG treatment system for a vessel includes a compressor compressing the BOG discharged from the storage tank; a medium pressure
(Continued)

gas engine receiving at least a part of the BOG compressed by the compressor, as fuel; a heat exchanger exchanging heat between the remaining part of the BOG, which is not supplied to the medium pressure gas engine as fuel, and the BOG, which is discharged from the storage tank and is not compressed; and an expander decompressing the remaining part of the BOG cooled by the heat exchanger.

4 Claims, 6 Drawing Sheets

(51) Int. Cl.
  F02C 3/22      (2006.01)
  F17C 7/04     (2006.01)
  F17C 13/00    (2006.01)
  B63B 25/16    (2006.01)
  F02M 21/06    (2006.01)
(52) U.S. Cl.
  CPC .............. *F17C 7/04* (2013.01); *F17C 13/004* (2013.01); *F25J 1/0025* (2013.01); *F17C 2221/033* (2013.01); *F17C 2260/03* (2013.01)

(56) References Cited

U.S. PATENT DOCUMENTS

| | | | |
|---|---|---|---|
| 3,885,394 A | 5/1975 | Witt et al. | |
| 3,919,852 A | 11/1975 | Jones | |
| 4,689,064 A | 8/1987 | Boulanger et al. | |
| 4,878,923 A | 11/1989 | Muller | |
| 8,117,852 B2 | 2/2012 | Mak | |
| 8,727,821 B2 | 5/2014 | Kwon et al. | |
| 9,168,993 B1 | 10/2015 | Lee et al. | |
| 9,239,186 B2 | 1/2016 | Jung et al. | |
| 2004/0068993 A1 | 4/2004 | Irie et al. | |
| 2008/0276627 A1 | 11/2008 | Lee et al. | |
| 2009/0126400 A1 | 5/2009 | Pozivil | |
| 2011/0056238 A1 | 3/2011 | Mak | |
| 2011/0146341 A1 | 6/2011 | Melaaen | |
| 2011/0146441 A1 | 6/2011 | Melaaen | |
| 2011/0185748 A1 | 8/2011 | Fuchs | |
| 2011/0277497 A1 | 11/2011 | Lee et al. | |
| 2012/0252285 A1 | 10/2012 | Lee et al. | |
| 2013/0340474 A1 | 12/2013 | Jung et al. | |
| 2014/0053600 A1 | 2/2014 | Jung et al. | |
| 2014/0060110 A1 | 3/2014 | Jung et al. | |
| 2014/0069117 A1 | 3/2014 | Jung et al. | |
| 2014/0069118 A1 | 3/2014 | Jung et al. | |
| 2014/0290279 A1 | 10/2014 | Lee et al. | |
| 2015/0226379 A1 | 8/2015 | Lee et al. | |
| 2015/0285189 A1 | 10/2015 | Lee et al. | |
| 2015/0300301 A1 | 10/2015 | Lee et al. | |
| 2015/0316208 A1 | 11/2015 | Bae et al. | |
| 2016/0215929 A1 | 7/2016 | Lee et al. | |

FOREIGN PATENT DOCUMENTS

| | | |
|---|---|---|
| EP | 1990272 A1 | 11/2008 |
| EP | 2808633 A2 | 12/2014 |
| GB | 1401584 A | 7/1975 |
| GB | 1472533 A | 5/1977 |
| JP | 49-88904 A | 8/1974 |
| JP | 63-302169 A | 12/1988 |
| JP | 6-336193 A | 12/1994 |
| JP | 2001-132896 A | 5/2001 |
| JP | 2002-508054 A | 3/2002 |
| JP | 2005-273681 A | 10/2005 |
| JP | 2006-349084 A | 12/2006 |
| JP | 2008-528882 A | 7/2008 |
| JP | 2009-504838 A | 2/2009 |
| JP | 2010-173483 A | 8/2010 |
| JP | 2010-537151 A | 12/2010 |
| JP | 2011-517749 | 6/2011 |
| JP | 2012-76561 A | 4/2012 |
| JP | 2012-516263 A | 7/2012 |
| JP | 2013-508216 A | 3/2013 |
| KR | 10-0823029 B1 | 4/2008 |
| KR | 10-2008-0099209 A | 11/2008 |
| KR | 10-2009-0025514 A | 3/2009 |
| KR | 10-0891958 B1 | 4/2009 |
| KR | 10-2010-0049213 A | 5/2010 |
| KR | 10-2010-0098166 A | 9/2010 |
| KR | 10-2010-0099441 A | 9/2010 |
| KR | 10-2010-0107298 A | 10/2010 |
| KR | 10-1026180 B1 | 3/2011 |
| KR | 10-2011-0042910 A | 4/2011 |
| KR | 10-2011-0050239 A | 5/2011 |
| KR | 10-2011-0073825 A | 6/2011 |
| KR | 10-1049229 B1 | 7/2011 |
| KR | 10-2011-0121134 A | 11/2011 |
| KR | 10-1106088 B1 | 1/2012 |
| KR | 10-2012-0049199 A | 5/2012 |
| KR | 10-2012-0049731 A | 5/2012 |
| KR | 10-2012-0107831 A | 10/2012 |
| KR | 10-2012-0107832 A | 10/2012 |
| KR | 10-2012-0109743 A | 10/2012 |
| KR | 10-2012-0114055 A | 10/2012 |
| KR | 10-2013-0021204 A | 3/2013 |
| KR | 10-2013-0061798 A | 6/2013 |
| RU | 2243445 C1 | 12/2004 |
| RU | 118596 U1 | 7/2012 |
| RU | 2481234 C1 | 5/2013 |
| SG | 11201402322 S | 10/2014 |
| SG | 11201503110 T | 6/2015 |
| SG | 11201503111 R | 6/2015 |
| SG | 11201503115 W | 6/2015 |
| SG | 11201504439 Y | 7/2015 |
| SU | 543360 A3 | 1/1977 |
| UA | 96052 C1 | 5/2013 |
| WO | 84/01339 A1 | 4/1984 |
| WO | 2009/006693 A1 | 1/2009 |
| WO | 2009/136793 A1 | 11/2009 |
| WO | 2010/101356 A1 | 9/2010 |
| WO | 2011/078689 A1 | 6/2011 |
| WO | 2012/128447 A1 | 9/2012 |
| WO | 2012/128448 A1 | 9/2012 |
| WO | 2012/128449 A1 | 9/2012 |
| WO | 2014/209029 A1 | 12/2014 |

OTHER PUBLICATIONS

Office Action dated Sep. 9, 2016 of copending U.S. Appl. No. 14/360,269—44 pages.
Chinese Office Action dated Sep. 28, 2016 of Chinese Patent Application No. 201380055569.1 corresponding to U.S. Appl. No. 15/091,465—6 pages.
Chinese Office Action dated Nov. 16, 2016 of Chinese Patent Application No. 201380003716.0 corresponding to related U.S. Appl. No. 14/360,269—9 pages.
Japanese Office Action dated Oct. 18, 2016 of Japanese Patent Application No. 2015-535580 corresponding to U.S. Appl. No. 14/437,479—3 pages.
Office Action dated Feb. 2, 2016 of copending U.S. Appl. No. 14/360,269—12 pages.
Office Action dated Dec. 9, 2016 of copending U.S. Appl. No. 14/692,639—53 pages.
Office Action dated Feb. 24, 2016 of copending U.S. Appl. No. 14/692,639—24 pages.
First Action Interview Pre-Interview Communication dated Nov. 17, 2016 of copending U.S. Appl. No. 14/437,479—31 pages.
Office Action dated Nov. 30, 2017 in corresponding Chinese Patent Application No. 201480036272.5—8 pages.
Notice of Allowance dated Jan. 12, 2018 in corresponding Singapore Application No. 11201510075V—5 pages.
Laursen, "Gas Fuelled Two-Stroke Ship Engines", Presented Nov. 27, 2013. Retrieved from http://helios-fp7.eu/helioswp/wp-contentluploads/2013/11 /The-Gas-Fuelled-Ship-Engine-Market. pdf.

(56) References Cited

OTHER PUBLICATIONS

International Search Report dated Feb. 6, 2014 of related PCT Application No. PCT/KR2013/009542 which is the parent application of related U.S. Appl. No. 14/692,639—5 pages.
International Search Report and Written Opinion dated Feb. 6, 2014 of related PCT Application No. PCT/KR2013/009540 which is the parent application of related U.S. Appl. No. 14/360,269—13 pages.
International Search Report dated Jan. 23, 2014 of related PCT Application No. PCT/KR2013/009541 which is the parent application of related U.S. Appl. No. 14/692,637—4 pages.
International Search Report dated Jan. 23, 2014 of related PCT Application No. PCT/KR2013/009543 which is the parent application of related U.S. Appl. No. 14/437,479—4 pages.
International Search Report dated Mar. 6, 2014 of related PCT Application No. PCT/KR2013/011078 which is the parent application of related U.S. Appl. No. 14/651,614—5 pages.
First Action Interview Pre-Interview Communication dated Aug. 5, 2015 of related U.S. Appl. No. 14/692,637—9 pages.
Written Opinion and Search Report dated Jan. 18, 2016 of Singapore Patent Application No. 11201503110T corresponding to U.S. Appl. 14/437,479—17 pages.
Hatanaka et al., "A Challenge to Advance LNG Transport for the 21ST Century—LNG Jamal: New LNG Carrier with Reliquefaction Plant", International Conference on LNG, Jan. 2001, vol. 13, pp. 6/2.1-6/2.8.
"Hyundai LNG Carrier—Now and in the Future", Presented at SHIP Efficiency 2013, Sep. 23, 2013—46 pages.
First Action Interview Office Action dated Oct. 22, 2015 of related U.S. Appl. No. 14/692,639—10 pages.
Russian Office Action dated May 5, 2016 of Russian Patent Application No. 2015119530/06 corresponding to U.S. Appl. No. 14/437,479—6 pages.
Chinese Office Action and Search Report dated Dec. 21, 2015 of Chinese Patent Application No. 2013800037160 corresponding to U.S. Appl. No. 14/360,269—7 pages.
Extended European Search Report dated Jun. 8, 2016 of European Patent Application No. 13848343.3 corresponding to related U.S. Appl. 14/437,479—6 pages.
Extended European Search Report dated Jun. 8, 2016 of European Patent Application No. 13849580.9 corresponding to related U.S. Appl. No. 14/692,639—6 pages.
European Extended Search Report dated Oct. 16, 2015 of European Patent Application No. 13844586.1 corresponding to U.S. Appl. No. 14/360,269—7 pages.
First Action Interview Pre-Interview Communication dated Jul. 17, 2015 of related U.S. Appl. No. 14/692,639—8 pages.
Japanese Office Action dated Mar. 15, 2016 of Japanese Patent Application No. 2015-535579 corresponding to U.S. Appl. No. 14/692,639—7 pages.
Japanese Office Action dated Mar. 8, 2016 of Japanese Office Action No. 2015-535580 corresponding to U.S. Appl. No. 14/437,479—4 pages.
Russian Office Action dated Apr. 29, 2016 of Russian Patent Application No. 2015104804/06 corresponding to U.S. Appl. No. 14/360,269—6 pages.
Singapore Office Action dated Feb. 16, 2016 of Singapore Patent Application No. 11201402322S corresponding to U.S. Appl. No. 14/360,269—20 pages.
Written Opinion and Search Report dated Feb. 1, 2016 of Singapore Patent Application No. 11201503115W corresponding to U.S. Appl. No. 14/692,639—13 pages.
"ME-GI Dual Fuel MAN B&W Engines", Mar. 27, 2012, Taken from http://www.corporate.man.eu.man/media/content_medien/doc/global_corporate_website_1/verantwortung_1/megatrends_2/klimawandel/me_gi_dual_fuel_en_01.pdf—37 pages.
Office Action dated Nov. 30, 2016 of corresponding Chinese Patent Application No. 201480036272.5—8 pages.
Extended European Search Report dated Dec. 8, 2016 of corresponding European Patent Application No. 14816835.4—6 pages.
Office Action dated Feb. 8, 2017 of copending U.S. Appl. No. 14/360,269—11 pages.
Final Office Action dated Sep. 7, 2017 of copending U.S. Appl. No. 15/091,465—32 pages.
Office Action dated Sep. 12, 2017 of Japanese Patent Application No. 2016-114893 corresponding to copending U.S. Appl. No. 14/360,269—4 pages.
Office Action dated Sep. 12, 2017 of Japanese Patent Application No. 2016-523648 corresponding to copending U.S. Appl. No. 14/895,201—6 pages.
IHI-SPB Tank for LNG Fueled Ship, Journal of IHI Technologies, 2012, vol. 52, No. 3, pp. 36-41.
Laursen, "LNG as fuel for 2-stroke propulsion of Merchant ships", Sep. 2012, Man Diesel & Turbo Second Session—42 pages.
Chellini, "Laby-Gi Compressor Developed for LNG Carrier Service", CompressorTechTwo, Aug.-Sep. 2008—8 pages.
Notice of Cancelation dated Aug. 8, 2017 in an opposition to Japanese Patent No. 6002330 (Japanese Patent Application No. 2015-535579; Opposition No. 2017-700338) corresponding to copending U.S. Appl. No. 14/692,639—13 pages.
Office Action dated Jul. 26, 2017 of copending U.S. Appl. No. 14/692,639—29 pages.
Office Action dated Sep. 21, 2017 of copending U.S. Appl. No. 14/360,269—40 pages
Japanese Office Action dated Feb. 28, 2017 corresponding to Japanese Patent Application No. 2016-523648—7 pages.
Search Report and Written Opinion dated Jan. 20, 2017 of Singapore Patent Application No. 11201510075V—8 pages.
Search Report dated Feb. 15, 2017 of Russian Patent Application No. 2015153066111—4 pages.
Japanese Office Action dated Jun. 6, 2017 of Japanese Patent Application No. 2015-535580 corresponding to U.S. Appl. No. 14/437,479—3 pages.
Office Action dated Mar. 7, 2017 of copending U.S. Appl. No. 15/091,465—47 pages.
First Action Interview Office Action dated May 2, 2017 of copending U.S. Appl. No. 14/437,479—7 pages.
Office Action dated May 29, 2017 of Omani Patent Application No. OM/P/2015/000099 to related U.S. Appl. No. 14/360,269—4 pages.

SYSTEM AND METHOD FOR TREATING BOIL-OFF GAS IN SHIP

TECHNICAL FIELD

The present invention relates to a boil-off gas (BOG) treatment system and method for a vessel, and more particularly, to a BOG treatment system and method for a vessel, in which BOG discharged from a storage tank is compressed, most of the BOG is used as the fuel of vessel engines, and a remaining part of the BOG is liquefied by cold energy of BOG newly discharged from the storage tank and is returned to the storage tank, thereby efficiently utilizing the BOG.

BACKGROUND ART

Recently, the consumption of liquefied gas, such as liquefied natural gas (LNG) or liquefied petroleum gas (LPG), has been rapidly increasing throughout the world. Liquefied gas is transported in a gas state through onshore or offshore gas pipelines, or is transported to a remote consumption place while being stored in a liquefied state inside a liquefied gas carrier. Liquefied gas, such as LNG or LPG, is obtained by cooling natural gas or petroleum gas to a cryogenic temperature (in the case of LNG, about −163° C.). Since the volume of liquefied gas is considerably reduced as compared to a gas state, liquefied gas is very suitable for a long-distance marine transportation.

A liquefied gas carrier such as an LNG carrier is designed to load liquefied gas, sail across the sea, and unload the liquefied gas at an onshore consumption place. To this end, the liquefied gas carrier includes a storage tank (also called "cargo tank") that can withstand a cryogenic temperature of liquefied gas.

Since the liquefaction temperature of natural gas is a cryogenic temperature of −163° C. at ambient pressure, LNG is likely to be vaporized even when the temperature of LNG is slightly higher than −163° C. at ambient pressure. In the case of a conventional LNG carrier, even though an LNG storage tank is thermally insulated, external heat is continuously transferred to LNG. Therefore, during the transportation of LNG by the LNG carrier, LNG is continuously vaporized within the LNG storage tank and boil-off gas (hereinafter, referred to as BOG) is generated within the LNG storage tank.

The generated natural gas may increase the inside pressure of the storage tank and accelerate the flow of the natural gas due to the rocking of the vessel, causing structural problems. Therefore, it is necessary to suppress the generation of BOG In addition, since BOG is loss of LNG, the suppression or reliquefaction of BOG is a very important issue in terms of transportation efficiency.

Conventionally, in order to suppress the generation of BOG within the storage tank of the liquefied gas carrier, a method of discharging the BOG from the storage tank and burning the BOG a method of discharging the BOG from the storage tank, reliquefying the BOG through a reliquefaction apparatus, and returning the BOG to the storage tank, a method of using the BOG as fuel for a vessel's propulsion engine, and a method of suppressing the generation of BOG by maintaining an inside pressure of a storage tank at a high level have been used solely or in combination.

In the case of a conventional vessel equipped with a BOG reliquefaction apparatus, BOG inside a storage tank is discharged from the storage tank and then reliquefied through a reliquefaction apparatus in order to maintain a pressure of the storage tank at an appropriate level. In this case, the discharged BOG is reliquefied through heat exchange with a refrigerant (for example, nitrogen, mixed refrigerant, or the like) cooled to a cryogenic temperature in the reliquefaction apparatus including a refrigeration cycle, and the reliquefied BOG is returned to the storage tank.

In the case of a conventional LNG carrier equipped with a DFDE propulsion system, BOG is consumed in such a manner that it is supplied as fuel to the DFDE after treating BOG by only a BOG compressor and heating, without installing the reliquefaction facility. Therefore, when an amount of fuel necessary for an engine is smaller than a generation amount of BOG, there is a problem that BOG is burnt in a gas combustion unit (GCU) or is vented to atmosphere.

Even though a conventional LNG carrier equipped with a reliquefaction facility and a low-speed diesel engine can treat BOG through the reliquefaction facility, the control of the entire system is complicated due to the operation complexity of the reliquefaction facility using nitrogen gas, and a considerable amount of power is consumed.

Consequently, there is a need for continuous research and development of systems and methods for efficiently treating liquefied gas, including BOG generated naturally from the storage tank.

DISCLOSURE

Technical Problem

The present invention has been made in an effort to solve the above problems and is directed to a BOG treatment system and method for a vessel, in which BOG discharged from a storage tank is compressed, most of the BOG is used as the fuel of vessel engines, and a remaining part of the BOG is liquefied by cold energy of BOG newly discharged from the storage tank and is returned to the storage tank, thereby efficiently utilizing the BOG.

Technical Solution

According to an aspect of the present invention, there is provided a BOG treatment system for a vessel, which treats BOG discharged from a storage tank storing liquefied gas, the BOG treatment system including: a compressor configured to compress the BOG discharged from the storage tank; a medium pressure gas engine configured to receive at least a part of the BOG, which is compressed by the compressor, as fuel; a heat exchanger configured to exchange heat between the remaining part of the BOG, which is not supplied to the medium pressure gas engine as fuel, and the BOG, which is discharged from the storage tank and is not compressed; and an expander configured to decompress the remaining part of the BOG that is heat-exchanged by the heat exchanger.

In this specification, the term "medium pressure" should be considered as meaning a pressure of about 5 to 20 bar at which the BOG as the fuel supplied to the engine is compressed.

The compressor may include: a compressor configured to compress the BOG discharged from the storage tank to a pressure necessary for the medium pressure gas engine; and a booster compressor configured to further compress the remaining part of the BOG, which is not supplied to the medium pressure gas engine.

The compressor may be a centrifugal type multi-stage compressor.

The compressor may compress the BOG to 5 to 20 bar.

The booster compressor may be a reciprocating type multi-stage compressor.

The booster compressor may compress the BOG to 80 to 250 bar.

An amount of the BOG supplied to the medium pressure gas engine may be determined in the range of 30 to 70% of the BOG discharged from the storage tank according to a load of the medium pressure gas engine.

Gas component of the remaining part of the BOG, which is decompressed while passing through the expander and becomes a gas-liquid mixed state, may be discharged from the storage tank and be joined with the BOG supplied to the heat exchanger.

Gas component of the remaining part of the BOG, which is decompressed while passing through the expander and becomes a gas-liquid mixed state, may be further decompressed while passing through another expander and be joined with the BOG supplied to the heat exchanger.

Liquid component of the remaining part of the BOG, which is decompressed while passing through the expander and becomes a gas-liquid state, may be returned to the storage tank.

The BOG treatment system may further include a forcible vaporizer configured to forcibly vaporize the liquefied gas stored in the storage tank and supply the forcibly vaporized liquefied gas to the compressor.

The BOG treatment system may further include a BOG consumer configured to receive and use the BOG compressed by the compressor.

The BOG consumer may be one or more of an integrated inert gas generator (IGG)/gas combustion unit (GCU) system, a GCU, and a gas turbine.

According to another aspect of the present invention, there is provided a BOG treatment method for a vessel, which treats BOG discharged from a storage tank storing liquefied gas, the BOG treatment method including: compressing the BOG discharged from the storage tank; supplying a medium pressure gas engine with at least a part of the BOG, which is compressed in the compressing step, to as fuel; exchanging heat between the remaining part of the BOG, which is not supplied to the medium pressure gas engine as fuel, and the BOG, which is discharged from the storage tank and is not compressed; and decompressing the remaining part of the BOG that is heat-exchanged in the heat exchanging step.

Gas component of the remaining part of the BOG, which is decompressed and becomes a gas-liquid mixed state, may be joined with the BOG discharged from the storage tank.

Gas component of the remaining part of the BOG, which is decompressed and becomes a gas-liquid mixed state, may be returned to the storage tank.

The heat exchanging step may further include additionally compressing the BOG compressed in the compressing step prior to heat exchange.

The BOG treatment method may further include: forcibly vaporizing the liquefied gas stored in the storage tank according to an amount of fuel necessary for the medium pressure gas engine in a ballast condition in which a generation amount of BOG is relatively small; and supplying the forcibly vaporized liquefied gas to the compressing step.

In a laden condition in which a generation amount of BOG is relatively large, a part of the BOG compressed in the compressing step may be supplied to the medium pressure gas engine, and the remaining part of the BOG that is not supplied to the medium pressure gas engine may be further compressed and be supplied to the heat exchanging step.

According to another aspect of the present invention, there is provided a vessel, which includes a storage tank storing liquefied gas, and a medium pressure gas engine using the liquefied gas stored in the storage tank as fuel, the vessel including: the above-described BOG treatment system, wherein the vessel generates electricity through the medium pressure gas engine, which is included in the BOG treatment system and receives the BOG discharged from the storage tank as fuel, and is propelled using a motor.

According to another aspect of the present invention, there is provided a method for manufacturing a vessel, which includes a storage tank configured to store liquefied gas, a compressor configured to compress BOG generated from the liquefied gas stored in the storage tank by discharging the BOG from the storage tank, and a medium pressure gas engine configured to use the BOG compressed by the compressor as fuel, wherein a booster compressor configured to further compress the BOG compressed by the compressor, a heat exchanger configured to cooling the BOG further compressed by the booster compressor by heat exchange with the BOG discharged from the storage tank, an expander configured to decompress the BOG cooled by the heat exchanger, a gas-liquid separator configured to separate the BOG, which is decompressed by the expander and becomes a gas-liquid mixed state, into gas component and liquid component, and a BOG recirculation line configured to join the gas component separated by the gas-liquid separator with the BOG discharged from the storage tank are additionally installed in the vessel.

The booster compressor may be configured to further compress the remaining part of the BOG, which is compressed by the compressor among the BOG discharged from the storage tank and is not supplied to the medium pressure gas engine.

The compressor may be a centrifugal type multi-stage compressor.

The compressor may compress the BOG to 5 to 20 bar.

The booster compressor may be a reciprocating type multi-stage compressor.

The booster compressor may compress the BOG to 80 to 250 bar.

An amount of the BOG supplied to the medium pressure gas engine may be determined in the range of 30 to 70% of the BOG discharged from the storage tank according to a load of the medium pressure gas engine.

Gas component of the remaining part of the BOG, which is decompressed while passing through the expander and becomes a gas-liquid mixed state, may be discharged from the storage tank and be joined with the BOG supplied to the heat exchanger.

Gas component of the remaining part of the BOG, which is decompressed while passing through the expander and becomes a gas-liquid mixed state, may be further decompressed while passing through another expander and be joined with the BOG supplied to the heat exchanger.

Liquid component of the remaining part of the BOG, which is decompressed while passing through the expander and becomes a gas-liquid state, may be returned to the storage tank.

The vessel may further include a forcible vaporizer configured to forcibly vaporize the liquefied gas stored in the storage tank and supply the forcibly vaporized liquefied gas to the compressor.

The vessel may further include a BOG consumer configured to receive and use the BOG compressed by the compressor.

The BOG consumer may be one or more of an integrated inert gas generator (IGG)/gas combustion unit (GCU) system, a GCU, and a gas turbine.

In a ballast condition in which a generation amount of BOG is relatively small, the liquefied gas stored in the storage tank may be forcibly vaporized according to an amount of fuel necessary for the medium pressure gas engine, and the forcibly vaporized liquefied gas may be supplied to the compressor.

In a laden condition in which a generation amount of BOG is relatively large, a part of the BOG compressed in the compressing step may be supplied to the medium pressure gas engine, and the remaining part of the BOG that is not supplied to the medium pressure gas engine may be further compressed and be supplied to the heat exchanger.

Advantageous Effects

According to the BOG treatment system and method of the present invention, a part of BOG compressed after pressurizing BOG discharged from the storage tank can be supplied as fuel to the vessel engine and the other compressed BOG can be newly discharged from the storage tank to return it to the storage tank by liquefying with cold energy of BOG before compression.

Therefore, according to the BOG treatment system and method of the present invention, BOG generated from the storage tank can be reliquefied without installing a reliquefaction apparatus consuming a large amount of energy and requiring excessive initial installation cost, thereby saving energy consumed in the reliquefaction apparatus.

According to the BOG treatment system and method of the present invention, all BOG generated during the transportation of cargo (that is, LNG) in the LNG carrier can be used as the fuel of the engine, or can be reliquefied, be returned to the storage tank, and be stored therein. Therefore, an amount of BOG consumed in the GCU or the like can be reduced. Furthermore, BOG can be treated by reliquefaction, without using separate refrigerants such as nitrogen.

In addition, in the BOG treatment system and method according to the present invention, since it is unnecessary to install the reliquefaction apparatuses using separate refrigerants (that is, nitrogen-refrigerant refrigeration cycle, mixed-refrigerant refrigeration cycle, or the like), facilities for supplying and storing the refrigerants need not be separately installed. Consequently, it is possible to save initial installation cost and operation cost for configuring the entire system.

DETAILED DESCRIPTION OF EMBODIMENTS

Figure 1:
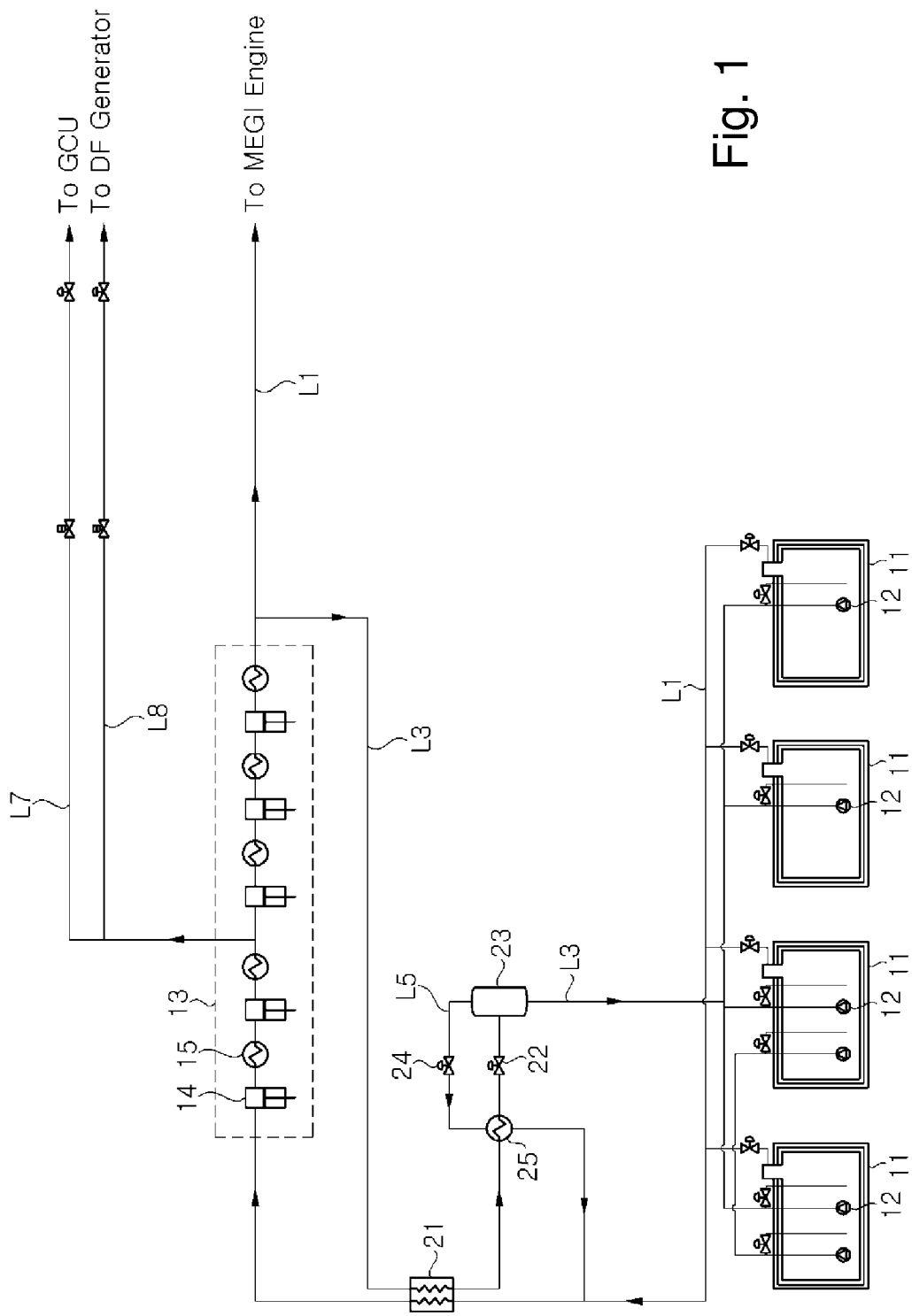
FIG. 1 is a schematic configuration diagram illustrating a BOG treatment system for a vessel according to a first embodiment of the present invention.

Embodiments of the present invention will be described below in detail with reference to the accompanying drawings. These embodiments are provided so that this disclosure will be thorough and complete, and will fully convey the scope of the invention to those skilled in the art. The invention may, however, be embodied in many different forms and should not be construed as being limited to the embodiments set forth herein. Throughout the drawings and description, like reference numerals will be used to refer to like elements.

The International Maritime Organization (IMO) regulates the emission of nitrogen oxides (NOx) and sulfur oxides (SOx) among exhaust gases of ships and also tries to regulate the emission of carbon dioxide ($CO_2$). In particular, the issue of the regulation of nitrogen oxides (NOx) and sulfur oxides (SOx) was raised by the Prevention of Marine Pollution from Ships (MARPOL) protocol in 1997. After eight long years, the protocol met effectuation requirements and entered into force in May 2005. Currently, the regulation is in force as a compulsory provision.

Therefore, in order to meet such a provision, a variety of methods have been introduced to reduce the emission of nitrogen oxides (NOx). As one of these methods, a high-pressure natural gas injection engine for an LNG carrier, for example, an MEGI engine, has been developed and used. As compared with the diesel engine of the same power, the MEGI engine can reduce the emission of pollutants (carbon dioxide: 23%, nitrogen compound: 80%, sulfur compound: 95% or more). Hence, the MEGI engine is considered as an environment-friendly next-generation engine.

Such an MEGI engine may be installed in a vessel such as an LNG carrier which transports LNG while storing the LNG in a storage tank capable of withstanding a cryogenic temperature. The term "vessel" as used herein includes an LNG carrier, an LNG RV, and offshore plants such as an LNG FPSO and an LNG FSRU. In this case, the MEGI engine uses natural gas as fuel and requires a high pressure of about 150 to 400 bara (absolute pressure) for gas supply, depending on a load thereof.

The MEGI can be directly connected to the propeller for propulsion. To this end, the MEGI engine is provided with a 2-stroke engine rotating at a low speed. That is, the MEGI engine is a low-speed 2-stroke high pressure natural gas injection engine.

In addition, in order to reduce the emission of nitrogen oxide, a DF engine (for example, DFDG: dual fuel diesel generator) using a mixture of diesel oil and natural gas as fuel has been developed and used for propulsion or power generation. The DF engine is an engine that can burn a mixture of oil and natural gas, or can selectively use one of oil and natural gas as fuel. Since a content of sulfur is smaller than that in the case where only oil is used as fuel, a content of sulfur oxide is small in exhaust gas. The DF engine need not supply fuel gas at a high pressure like the MEGI engine, and has only to supply fuel gas after compressing it to about several bara to several tens bara. The DF engine obtains power by driving a power generator through the driving force of the engine. This power can be used to drive a propulsion motor or operate various apparatuses or facilities. The propulsion or power generation system, which obtains power by using the DF engine, is referred to as a dual fuel diesel electric (DFDE) system.

When supplying natural gas as fuel, it is unnecessary to match the methane number in the case of the MEGI engine, but it is necessary to match the methane number in the case of the DF engine.

If LNG is heated, methane component having a relatively low liquefaction temperature is preferentially vaporized. Hence, since a methane content of BOG is high, the BOG can be directly supplied as fuel to the DF engine. However, since the methane content of the LNG is relatively lower than that of the BOG, the methane number of the LNG is lower than the methane number required in the DF engine. Ratios of hydrocarbon components (methane, ethane, propane, butane, and the like) constituting the LNG are different according to producing areas. Therefore, it is not suitable to vaporize the LNG as it is and then supply the vaporized LNG to the DF engine as fuel.

In order to adjust the methane number, the heavy hydrocarbon (HHC) component having a higher liquefaction point than methane can be liquefied and removed by forcibly vaporizing the LNG and lowering the temperature of the LNG. After the methane number is adjusted, it is possible to additionally heat natural gas whose methane number is adjusted according to the temperature condition required in the engine.

As the vessel engine using natural gas as fuel has been developed and mounted on the vessel, there is a need to install a storage tank in the vessel so as to store LNG as fuel.

Examples of a marine structure provided with a storage tank capable of storing cryogenic liquefied gas may include vessels such as a liquefied gas carrier and an LNG Regasification Vessel (LNG RV), or structures such as an LNG Floating Storage and Regasification Unit (LNG FSRU), LNG Floating and Regasification Unit (LNG FRU), an LNG Floating, Production, Storage and Off-loading (LNG FPSO), Floating Storage Power Plant (FSPP), and a Barge Mounted Power Plant (BMPP).

The LNG RV is a self-propelled, floatable LNG carrier equipped with an LNG regasification facility, and the LNG FSRU is a marine structure that stores LNG unloaded from an LNG carrier on the sea far away from the land and, if necessary, supplies the LNG to an offshore consumer by gasifying the LNG. The LNG FRU is a marine structure that has no storage function and supplies LNG to a land consumer by gasifying the LNG, while being used in cooperation with a separate storage tank. The LNG FPSO is a marine structure that refines extracted LNG on the sea, stores the LNG in a storage tank after direct liquefaction, and, if necessary, transships the LNG to an LNG carrier. The FSPP is a structure that is equipped with an LNG storage tank and a power generation facility in a hull floating on the sea and generates electricity on the sea. The BMPP is a structure that is equipped with a power generation facility to produce electricity on the sea.

The term "vessel" as used herein is a concept including a liquefied gas carrier such as an LNG carrier, and structures such as an LNG RV, an LNG FPSO, an LNG FSRU, an LNG FRU, an FSPP, and a BMPP.

Hereinafter, configurations and operations of embodiments of the present invention will be described in detail with reference to the accompanying drawings. In addition, the following embodiments can be modified in various forms and are not intended to limit the scope of the present invention.

FIG. 1 is a configuration diagram illustrating a BOG treatment system for a vessel according to a first embodiment of the present invention.

Although FIG. 1 illustrates an example in which the BOG treatment system of the present invention is applied to an LNG carrier equipped with a high pressure natural gas injection engine (e.g., an MEGI engine) as a vessel engine capable of using natural gas as fuel, the BOG treatment system of the present invention can also be applied to any type of vessels (LNG carrier, LNG RV, and the like) and marine plants (FSPP, BMPP, LNG FRU, LNG FPSO, LNG FSRU, and the like), in which a liquefied gas storage tank is installed.

In the BOG treatment system for the vessel according to the first embodiment of the present invention, boil-off gas (NBOG) generated and discharged from a storage tank 11 storing liquefied gas is transferred along a BOG supply line L1, is compressed in a compressor 13, and is then supplied to the high pressure natural gas injection engine, for example, the MEGI engine. The boil-off gas is compressed at a high pressure of about 150 to 400 bara by the compressor 13 and is then supplied as fuel to the high pressure natural gas injection engine, for example, the MEGI engine.

The storage tank 11 has sealing and heat-insulating walls so as to store liquefied gas such as LNG in a cryogenic state, but cannot perfectly block heat transferred from the outside. Therefore, the liquefied gas is continuously vaporized within the storage tank 11. In order to maintain the pressure of the BOG at an appropriate level, BOG is discharged from the storage tank 11 through the BOG discharge line L1.

A discharge pump 12 is installed within the storage tank 11 so as to discharge LNG to the outside of the storage tank 11 when necessary.

The compressor 13 may include one or more compression cylinders 14 and one or more intercoolers 15 for cooling BOG of which the temperature is raised. The compressor 13 may be configured to compress BOG to, for example, about 301 bara. Although FIG. 1 illustrates the reciprocating type multi-stage compressor 13 including five compression cylinders 14 and five intercoolers 15, the number of the compression cylinders and the number of the intercoolers may be changed when necessary. In addition, a plurality of compression cylinders may be arranged within a single compressor, and a plurality of compressors may be connected in series.

BOG compressed in the compressor 13 is supplied to the high pressure natural gas injection engine through the BOG supply line L1. All or part of the compressed BOG may be supplied to the high pressure natural gas injection engine according to an amount of fuel necessary for the high pressure natural gas injection engine.

In addition, according to the first embodiment of the present invention, when BOG discharged from the storage tank 11 and compressed in the compressor 13 (that is, all BOG discharged from the storage tank) is a first stream, the first stream of the BOG may be divided into a second stream and a third stream after compression. The second stream may be supplied as fuel to the high pressure natural gas injection engine, and the third stream may be liquefied and returned to the storage tank 11.

At this time, the second stream is supplied to the high pressure natural gas injection engine through the BOG supply line L1. The third stream is returned to the storage tank 11 through the BOG return line L3. A heat exchanger 21 is installed in the BOG return line L3 so as to liquefy the third stream of the compressed BOG. The third stream of the BOG compressed in the heat exchanger 21 exchanges heat with the first stream of the BOG discharged from the storage tank 11 and then supplied to the compressor 13.

Since a flow rate of the first stream of the BOG before compression is larger than a flow rate of the third stream, the third stream of the compressed BOG may be cooled by receiving cold energy from the first stream of the BOG before compression. As such, in the heat exchanger 21, the BOG of the high pressure state is cooled (that is, at least partially liquefied) by heat exchange between the BOG of the cryogenic temperature immediately after being discharged from the storage tank 11 and the BOG of the high pressure state compressed in the compressor 13.

The boil-off gas (LBOG) liquefied in the heat exchanger 21 is decompressed while passing through an expansion valve 22, and is supplied to a gas-liquid separator 23 in a gas-liquid mixed state. The LBOG may be decompressed to approximately atmospheric pressure while passing through the expansion valve 22. The BOG, which is at least partially liquefied, is separated into gas and liquid components in the gas-liquid separator 23. The liquid component, that is, LNG, is transferred to the storage tank 11 through the BOG return line L3, and the gas component, that is, BOG, is discharged from the storage tank 11 through a BOG recirculation line L5 and is joined with BOG to be supplied to the compressor 13. More specifically, the BOG recirculation line L5 extends from an upper end of the gas-liquid separator 23 and is connected to a more upstream side than the heat exchanger 21 in the BOG supply line L1.

In addition to the returning to the storage tank 11, the liquid component may be supplied to and stored in a separate tank (not illustrated). Furthermore, the system may be configured such that, instead of separating the BOG into the liquid component and the gas component in the gas-liquid separator 23, the expanded BOG is directly returned to the storage tank 11 without passing through the gas-liquid separator 23 (that is, not including the gas-liquid separator in the system).

For convenience of explanation, it has been described that the heat exchanger 21 is installed in the BOG return line L3, but the heat exchanger 21 may be installed in the BOG supply line L1 because the heat exchange is actually performed between the first stream of the BOG transferred through the BOG supply line L1 and the third stream of the BOG transferred through the BOG return line L3.

Another expansion valve 24 may be further installed in the BOG recirculation line L5. Therefore, the gas component discharged from the gas-liquid separator 23 may be decompressed while passing through the expansion valve 24. In addition, a cooler 25 is installed in the BOG recirculation line L5 so as to further cool the third stream by heat exchange between the third stream of the BOG liquefied in the heat exchanger 21 and supplied to the gas-liquid separator 23 and the gas component separated from the gas-liquid separator 23 and transferred through the BOG recirculation line L5. That is, the cooler 25 additionally cools the BOG of a high pressure liquid state with natural gas of a low pressure cryogenic gas state.

For convenience of explanation, it has been described that the cooler 25 is installed in the BOG recirculation line L5, but the cooler 25 may be installed in the BOG return line L3 because the heat exchange is actually performed between the third stream of the BOG transferred through the BOG return line L3 and the gas component transferred through the BOG recirculation line L5.

The cooler 25 may be omitted. In a case where the cooler 25 is omitted, the reliquefaction efficiency may be slightly reduced, but the installation cost of the cooler can be saved and the pipe arrangement and the system operation can be simplified, thereby increasing the operation efficiency.

Meanwhile, when it is expected that surplus BOG will be generated because an amount of BOG generated in the storage tank 11 is larger than an amount of fuel necessary for the high pressure natural gas injection engine, BOG having been compressed or being compressed stepwise in the compressor 13 is branched through the BOG branch lines L7 and L8 and is then used in BOG consuming means. Examples of the BOG consuming means may include a GCU, a DF generator (DFDG), and a gas turbine, each of which can use natural gas having a relatively lower pressure than the MEGI engine as fuel.

As described above, in the BOG treatment system and method according to the first embodiment of the present invention, BOG generated during the transportation of cargo (that is, LNG) in the LNG carrier may be used as the fuel of the engine, or may be reliquefied, be returned to the storage tank, and be stored therein. Therefore, an amount of BOG consumed in the GCU or the like can be reduced or removed. Furthermore, BOG can be treated by reliquefaction, without installing reliquefaction apparatuses using separate refrigerants such as nitrogen.

In addition, in the BOG treatment system and method according to the first embodiment of the present invention, since it is unnecessary to install the reliquefaction apparatuses using separate refrigerants (that is, nitrogen-refrigerant refrigeration cycle, mixed-refrigerant refrigeration cycle, or the like), facilities for supplying and storing the refrigerants need not be separately installed. Consequently, it is possible to save initial installation cost and operation cost for configuring the entire system.

Figure 2:
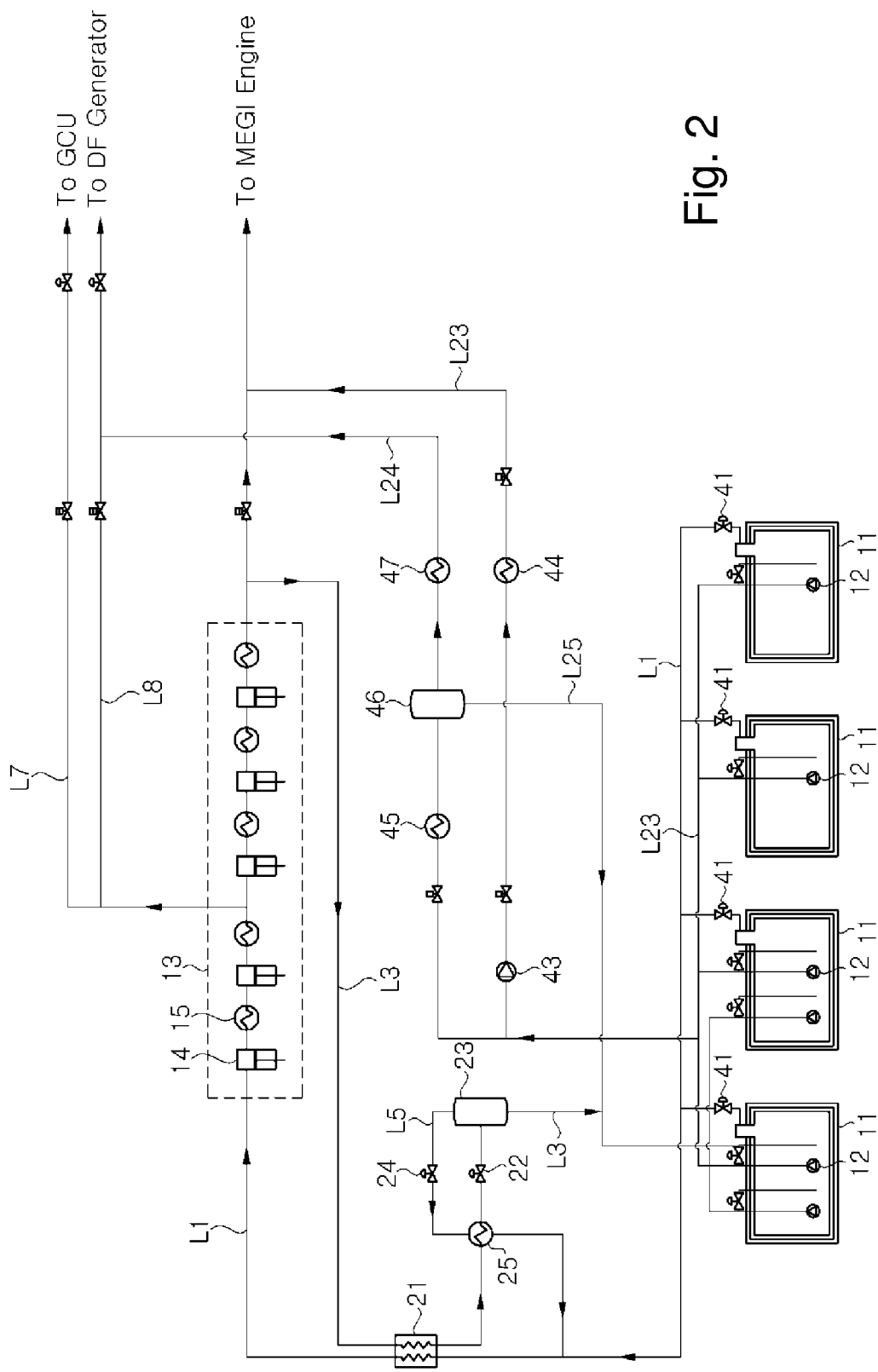
FIG. 2 is a schematic configuration diagram illustrating a BOG treatment system for a vessel according to a second embodiment of the present invention.

FIG. 2 is a schematic configuration diagram illustrating a BOG treatment system for a vessel according to a second embodiment of the present invention.

The BOG treatment system according to the second embodiment differs from the BOG treatment system according to the first embodiment in that LNG can be used after forcible vaporization when an amount of BOG necessary for the MEGI engine or the DF generator is larger than an amount of BOG generated naturally in the storage tank 11. Hereinafter, only a difference from the BOG treatment system of the first embodiment will be described in more detail.

The BOG treatment system for the vessel according to the second embodiment of the present invention is substantially identical to the BOG treatment system according to the first embodiment in that boil-off gas (NBOG) generated and discharged from a storage tank 11 storing liquefied gas is transferred along a BOG supply line L1, is compressed in a compressor 13, and is then supplied to a high pressure natural gas injection engine, for example, an MEGI engine, or NBOG is supplied to a DF engine (DF generator) while being multi-stage compressed in the compressor 13 and is then used as fuel therein.

However, the BOG treatment system according to the second embodiment includes a forcible vaporization line L11 such that LNG stored in the storage tank 11 can be vaporized in a forcible vaporizer 31 and be then supplied to the compressor 13 when an amount of BOG required as fuel in the high pressure natural gas injection engine or the DF engine is larger than an amount of BOG generated naturally in the storage tank 11.

When the forcible vaporization line L11 is provided as in the second embodiment, fuel can be stably supplied even when a small amount of BOG is generated because a small amount of LNG is stored in the storage tank 11, or an amount of BOG required as fuel in various engines is larger than an amount of BOG generated naturally in the storage tank 11.

Figure 3:
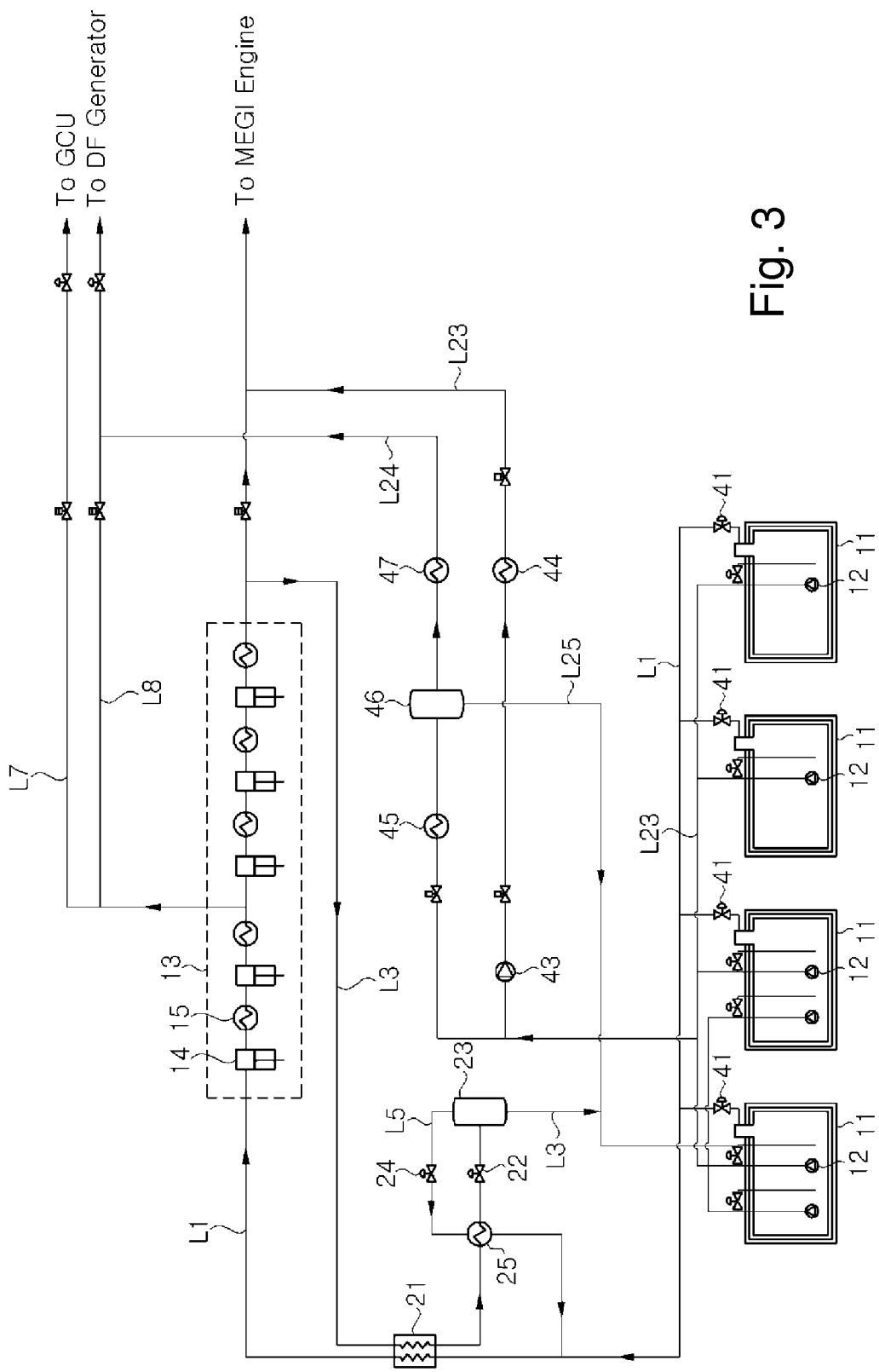
FIG. 3 is a schematic configuration diagram illustrating a state in which the BOG treatment system according to the first embodiment of the present invention is used together with a fuel gas supply system.

FIG. 3 is a schematic configuration diagram illustrating a state in which the BOG treatment system according to the present invention is used together with a fuel gas supply system for supplying fuel to the engine.

FIG. 3 illustrates a state in which the BOG treatment system of FIG. 1 according to the first embodiment of the present invention is combined with the fuel gas supply system, but the BOG treatment system according to the second embodiment of the present invention may be used in combination with the fuel gas supply system.

The fuel gas supply system for the vessel as illustrated in FIG. 13 according to the present invention includes a high pressure natural gas injection engine (for example, MEGI engine) as a main engine, and a DF engine (DF generator: DFDG) as a sub engine. Generally, the main engine is used for propulsion to navigate the vessel, and the sub engine is used for power generation to supply power to various apparatuses and facilities installed in the vessel. However, the present invention is not limited to the purposes of the main engine and the sub engine. A plurality of main engines and a plurality of sub engines may be installed.

The fuel gas supply system for the vessel according to the present invention is configured such that the natural gas stored in the storage tank 11 (that is, the BOG of the gas state and the LNG of the liquid state) can be supplied as fuel to the engines (that is, the MEGI engine serving as the main engine and the DF engine serving as the sub engine).

In order to supply the BOG of the gas state as fuel gas, the fuel gas supply system according to the present embodiment includes a main BOG supply line L1 serving as a BOG supply line to supply the main engine with BOG stored in the storage tank 11, and a sub BOG supply line L8 branched from the main BOG supply line L1 to supply the sub engine with BOG. The main BOG supply line L1 has the same configuration as the BOG supply line L1 of FIGS. 1 and 2. However, in the description given with reference to FIG. 3, this BOG supply line is referred to as the main BOG supply line L1 so as to distinguish from the BOG supply line for the DF engine (that is, the sub BOG supply line L8).

In order to supply the LNG of the liquid state as fuel gas, the fuel gas supply system according to the present embodiment includes a main LNG supply line L23 serving to supply the main engine with LNG stored in the storage tank 11, and a sub LNG supply line L24 branched from the main LNG supply line L23 to supply the sub engine with LNG.

According to the present embodiment, a compressor 13 for compressing the BOG is installed in the main BOG supply line L1, and a high pressure pump 43 for compressing the LNG is installed in the main LNG supply line L23.

The NBOG generated in the storage tank 11 storing liquefied gas and discharged through the BOG discharge valve 41 is transferred along the main BOG supply line L1, is compressed in the compressor 13, and is then supplied to the high pressure natural gas injection engine, for example, the MEGI engine. The BOG is compressed at a high pressure of about 150 to 400 bara by the compressor 13 and is then supplied to the high pressure natural gas injection engine.

The storage tank 11 has sealing and heat-insulating walls so as to store liquefied gas such as LNG in a cryogenic state, but cannot perfectly block heat transferred from the outside. Therefore, the liquefied gas is continuously vaporized within the storage tank 11, and BOG inside the storage tank 11 is discharged so as to maintain the pressure of the BOG at an appropriate level.

The compressor 13 may include one or more compression cylinders 14 and one or more intercoolers 15 for cooling BOG of which the temperature is raised. The compressor 13 may be configured to compress BOG to, for example, about 301 bara. Although FIG. 1 illustrates the multi-stage compressor 13 including five compression cylinders 14 and five intercoolers 15, the number of the compression cylinders and the number of the intercoolers may be changed when necessary. In addition, a plurality of compression cylinders may be arranged within a single compressor, and a plurality of compressors may be connected in series.

The BOG compressed in the compressor 13 is supplied to the high pressure natural gas injection engine through the main BOG supply line L1. All or part of the compressed BOG may be supplied to the high pressure natural gas injection engine according to an amount of fuel necessary for the high pressure natural gas injection engine.

The sub BOG supply line L8 for supply fuel gas to the sub engine (that is, the DF engine) is branched from the main BOG supply line L1. More specifically, the sub BOG supply line L8 is branched from the main BOG supply line L1 such that BOG can be branched in the process of being multi-stage compressed in the compressor 13. Although FIG. 1 illustrates that the 2-stage compressed BOG is branched and a part of the BOG is supplied to the sub engine through the sub BOG supply line L8, this is merely exemplary.

The required pressure of the DF engine (for example, DFDG) serving as the sub engine is lower than that of the MEGI engine. Therefore, when the BOG compressed at a high pressure is branched at the rear end of the compressor 13, it is inefficient because the pressure of the BOG needs to be lowered again and then supplied to the sub engine.

As described above, if LNG is heated, methane component having a relatively low liquefaction temperature is preferentially vaporized. Hence, since a methane content of BOG is high, the BOG can be directly supplied as fuel to the DF engine. Therefore, separate apparatuses for adjusting methane number need not be installed in the main BOG supply line and the sub BOG supply line.

Meanwhile, when it is expected that surplus BOG will be generated because an amount of BOG generated in the storage tank 11 is larger than an amount of fuel necessary for the main engine and the sub engine, the BOG can be reliquefied through the BOG treatment system of the present invention and be returned to the storage tank.

When BOG is generated over the reliquefaction capacity, BOG having been compressed or being compressed stepwise in the compressor 13 can be branched through the BOG branch line L7 and be used in the BOG consuming means. Examples of the BOG consuming means may include a GCU and a gas turbine, each of which can use natural gas having a relatively lower pressure than the MEGI engine as fuel. As illustrated in FIG. 3, the BOG branch line L7 may be branched from the sub BOG supply line L8.

Since the process in which at least a part of BOG compressed in the compressor 13 and then supplied to the high pressure natural gas injection engine through the BOG supply line L1 is treated through the BOG return line L3, that is, reliquefied and returned to the storage tank 11 is identical to that described with reference to FIGS. 1 and 2, a detailed description thereof will be omitted.

A discharge pump 12 and a high pressure pump 43 are installed in the main LNG supply line L23. The discharge pump 12 is installed inside the storage tank 11 and configured to discharge LNG to the outside of the storage tank 11. The high pressure pump 43 is configured to secondarily compress LNG, which is primarily compressed in the discharge pump 12, to a pressure necessary for the MEGI engine. The discharge pump 12 may be installed in each storage tank 11. Although only one high pressure pump 43 is illustrated in FIG. 3, a plurality of high pumps may be connected in parallel when necessary.

As described above, the pressure of the fuel gas necessary for the MEGI engine is a high pressure of about 150 to 400 bara (absolute pressure).

The LNG discharged from the storage tank 11 storing liquefied gas through the discharge pump 12 is transferred along the main LNG supply line L23 and is then supplied to the high pressure pump 43. Then, the LNG is compressed to a high pressure in the high pressure pump 43, is supplied to the vaporizer 44, and is vaporized in the vaporizer 44. The vaporized LNG is supplied as fuel to the high pressure natural gas injection engine, that is, the MEGI engine. Since the pressure necessary for the MEGI engine is in a supercritical state, the LNG compressed to the high pressure is a state that is neither gas nor liquid. Therefore, it should be considered that the expression "vaporizing the LNG compressed to the high pressure in the vaporizer 44" means raising the temperature of the LNG being in the supercritical state up to a temperature necessary for the MEGI engine.

The sub LNG supply line L24 for supply fuel gas to the sub engine (that is, the DF engine) is branched from the main LNG supply line L23. More specifically, the sub LNG supply line L24 is branched from the main LNG supply line L23 such that LNG can be branched before being compressed in the high pressure pump 43.

A vaporizer 45, a gas-liquid separator 46, and a heater 47 are installed in the sub LNG supply line L24 so as to adjust the methane number and temperature of LNG supplied as fuel to the value required in the DF engine.

As described above, since the methane content of the LNG is relatively low, the methane number of the LNG is lower than the methane number required in the DF engine. Ratios of hydrocarbon components (methane, ethane, propane, butane, and the like) constituting the LNG are different according to producing areas. Therefore, it is not suitable to vaporize the LNG as it is and then supply the vaporized LNG to the DF engine as fuel.

In order to adjust the methane number, the LNG is heated and partially vaporized in the vaporizer 45 The fuel gas partially vaporized to a state in which the gas state (that is, natural gas) and the liquid state (that is, LNG) are mixed is supplied to the gas-liquid separator 46 and is separated into gas and liquid. Since the vaporization temperature of heavy hydrocarbon (HHC) component having a high calorific value is relatively high, a ratio of the HHC component is relatively increased in the LNG of the liquid state that remains without being vaporized in the partially vaporized BOG. Therefore, the methane number of the fuel gas can be increased by separating the liquid component in the gas-liquid separator 46, that is, by separating the HHC component.

In order to obtain appropriate methane number, the heating temperature in the vaporizer 45 can be adjusted considering the ratio of the hydrocarbon component included in the LNG, the methane number required in the engine, and the like. The heating temperature in the vaporizer 45 may be determined in the range of −80° C. to −120° C. The liquid component separated from the fuel gas in the gas-liquid separator 46 is returned to the storage tank 11 through the liquid-component return line L5. The BOG return line L3 and the liquid-component return line L25 may extend to the storage tank 11 after joining each other.

The fuel gas, the methane number of which is adjusted, is supplied to the heater 47 through the sub LNG supply line L24, is further heated to a temperature required in the sub engine, and is then supplied as fuel to the sub engine. For example, when the sub engine is the DFDG, the required methane number is generally 80 or more. For example, in the case of general LNG (typically, methane: 89.6%, nitrogen: 0.6%), the methane number before separating the HHC component is 71.3, and a lower heating value (LHV) at that time is 48, 872.8 kJ/kg (at 1 atm, saturated vapor). When the HHC component is removed by compressing the general LNG to 7 bara and heating it to −120° C., the methane number is increased to 95.5 and the LHV at that time is 49, 265.6 kJ/kg.

According to the present embodiment, there are two passages through which the fuel gas is supplied to the engines (the main engine and the sub engine). That is, the fuel gas may be supplied to the engines after being compressed through the compressor 13, or may be supplied to the engines after being compressed through the high pressure pump 43.

In particular, a vessel, such as LNG carrier or LNG RV, is used to transport LNG from a producing area to a consumer. Therefore, when sailing to the consumer, the vessel sails in a laden condition in which the LNG is fully loaded into the storage tank. When returning to the producing area after unloading the LNG, the vessel sails in a ballast condition in which the storage tank is almost empty. In the laden condition, a large amount of BOG is generated because an amount of LNG is relatively large. In the ballast condition, a relatively small amount of BOG is generated because an amount of LNG is small.

Although there is a difference according to the capacity of the storage tank, outside temperature, and the like, an amount of BOG generated when the capacity of the LNG storage tank is about 130,000 $m^3$ to 350,000 $m^3$ is 3 to 4 ton/h in the laden condition and is 0.3 to 0.4 ton/h in the ballast condition. In addition, an amount of fuel gas necessary for the engines is about 1 to 4 ton/h (about 1.5 ton/h on average) in the case of the MEGI engine and is about 0.5 ton/h in the case of the DF engine (DFDG). Meanwhile, in recent years, since a boil-off rate (BOR) has tended to be lowered due to the improvement in the heat insulation performance of the storage tank, a generation amount of BOG has tended to be reduced.

Therefore, in the case where both the compressor line (that is, L1 and L8 in FIG. 3) and the high pressure pump line (that is, L23 and L24 in FIG. 3) are provided like the fuel gas supply system of the present embodiment, it is preferable that the fuel gas is supplied to the engines through the compressor line in the laden condition in which a large amount of BOG is generated, and the fuel gas is supplied to the engines through the high pressure pump lines in the ballast condition in which a small amount of BOG is generated.

Generally, energy necessary for the compressor to compress gas (BOG) up to the high pressure of about 150 to 400 bara (absolute pressure) required in the MEGI engine is considerably more than energy necessary for the pump to compress liquid (LNG). The compressor for compressing the gas to the high pressure is very expensive and occupies a large space. Therefore, it can be considered that the use of the high pump line alone without any compression line is cost-effective. For example, 2-MW power is consumed for supplying fuel to the MEGI engine by driving one set of the compressor configured with the multi-stage. However, if the high pressure pump is used, 100-kW power is consumed. However, when the fuel gas is supplied to the engines by using the high pressure pump line alone in the laden condition, a reliquefaction apparatus for reliquefying BOG is necessarily required so as to treat BOG continuously generated in the storage tank. When considering energy consumed in the reliquefaction apparatus, it is advantageous that both the compressor line and the high pressure pump line are installed, the fuel gas is supplied through the compressor line in the laden condition, and the fuel gas is supplied through the high pressure pump line in the ballast condition.

Meanwhile, like the ballast condition, when an amount of BOG generated in the storage tank is smaller than an amount of fuel necessary for the MEGI engine, it may be efficient to branch BOG through the sub BOG supply line L8 in the process of being multi-stage compressed and use the branched BOG as the fuel of the DF engine, without compressing BOG in the multi-stage compressor to the high pressure required in the MEGI. That is, for example, if BOG is supplied to the DF engine through only the 2-stage compression cylinders of the 5-stage compressor, the remaining 3-stage compression cylinders run idle. 2-MW power is required when BOG is compressed by driving the entire 5-stage compressor. 600-kW power is required when the 2-stage compression cylinders are used and the remaining 3-stage compression cylinders run idle. 100-kW power is required when the fuel is supplied to the MEGI engine through the high pressure pump. Therefore, like the ballast condition, when a generation amount of BOG is smaller than an amount of fuel necessary for the MEGI engine, it is advantageous in terms of energy efficiency to consume all amount of BOG in the DF engine or the like and supply LNG as fuel through the high pressure pump.

However, if necessary, even when a generation amount of BOG is smaller than an amount of fuel necessary for the MEGI engine, LNG may be forcibly vaporized and supplied as much as a deficient amount while supplying BOG as fuel to the MEGI engine through the compressor. Meanwhile, since a generation amount of BOG is small in the ballast condition, BOG is not discharged but accumulated until the storage tank reaches a predetermined pressure, and is intermittently discharged and supplied as fuel to the DF engine or the MEGI engine, instead of discharging and consuming BOG whenever the BOG is generated.

In addition, in the vessels where it is not easy to repair and replace equipments, important facilities are required to be installed by two in consideration of emergency (redundancy). That is, the redundancy of important facilities is required such that extra facilities capable of performing the same function as the main facility, and the extra equipment is set to a standby state during the normal operation of the main facility and takes over the function of the main facility when the main facility does not operate due to malfunction. Examples of the facilities requiring the redundancy may include rotating facilities, for example, compressors or pumps.

As such, various facilities need to be redundantly installed in the vessel so as to satisfy only the redundancy requirement while not being used at regular days. The fuel gas supply system using two compression lines requires much cost and space for the installation of the compressor. When using the fuel gas supply system, much energy is consumed. The fuel gas supply system using two high pressure pump lines may consume much energy in the treatment (reliquefaction) of BOG. On the other hand, in the fuel gas supply system of the present invention in which one compressor line and one high pressure pump line are installed, even when there occurs a problem in one of the supply lines, the vessel can continue to sail normally through the other supply line. Expensive compressors are less used and an optimal fuel gas supply method can be appropriately selected and used according to a generation amount of BOG. Therefore, it is possible to save operation cost as well as initial shipbuilding cost.

As illustrated in FIG. 3, when the BOG treatment system and the fuel gas supply system are combined according to the present invention, BOG generated during the transportation of cargo (that is, LNG) in the LNG carrier may be used as the fuel of the engine, or may be reliquefied, be returned to the storage tank, and be stored therein. Therefore, an amount of BOG consumed in the GCU or the like can be reduced or removed. Furthermore, BOG can be treated by reliquefaction, without installing reliquefaction apparatuses using separate refrigerants such as nitrogen.

According to the present invention, in spite of the recent trend that the generation amount of BOG is increased due to the increased capacity of the storage tank and a necessary amount of fuel is reduced due to the improved performance of the engine, the BOG remaining after being used as the fuel of the engine can be reliquefied and returned to the storage tank, thereby preventing the waste of BOG.

In particular, in the BOG treatment system and method according to the present embodiment, since it is unnecessary to install the reliquefaction apparatuses using separate refrigerants (that is, nitrogen-refrigerant refrigeration cycle, mixed-refrigerant refrigeration cycle, or the like), facilities for supplying and storing the refrigerants need not be separately installed. Consequently, it is possible to save initial installation cost and operation cost for configuring the entire system.

Figure 4:
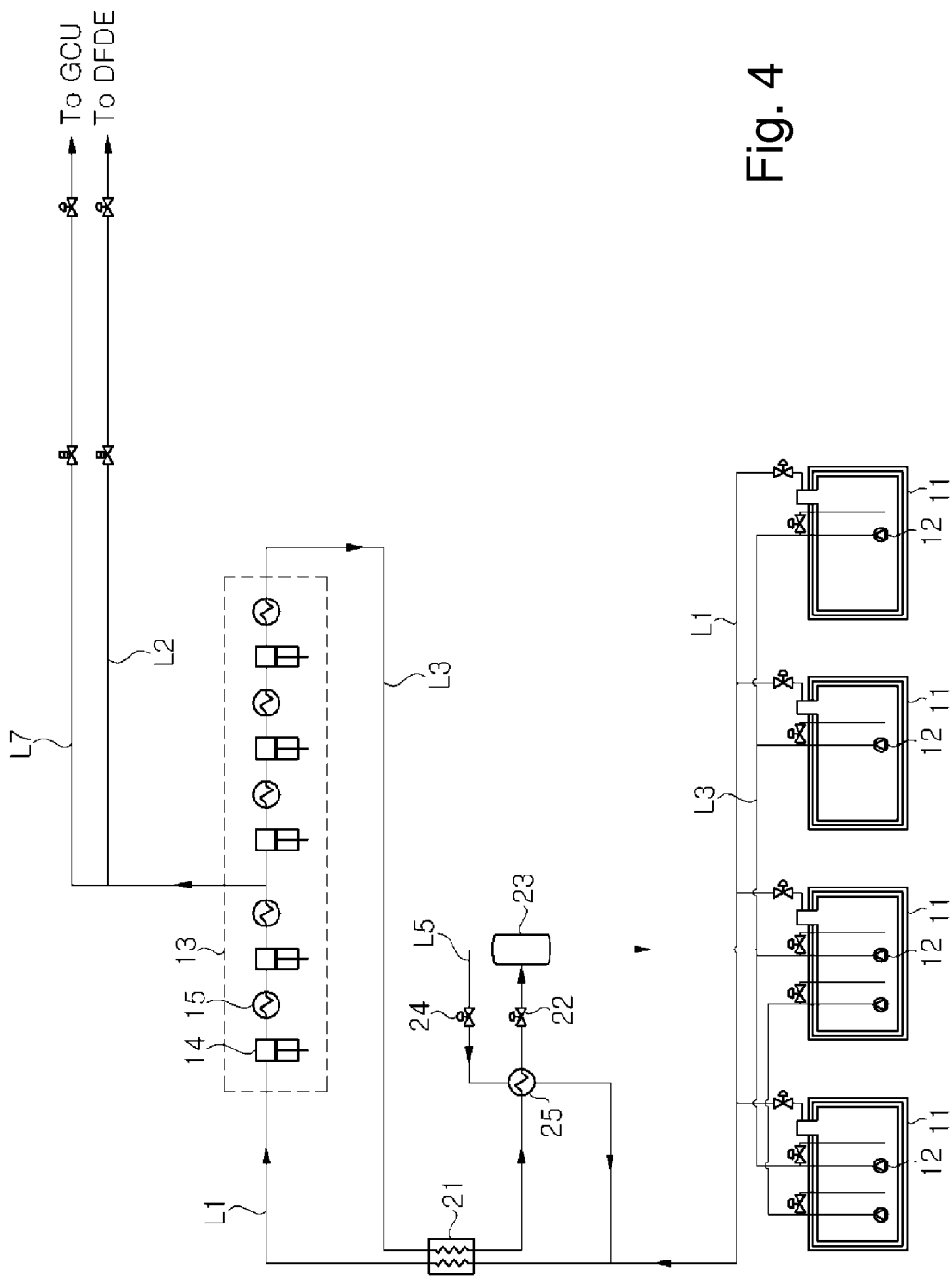
FIG. 4 is a schematic configuration diagram illustrating a BOG treatment system for a vessel according to a third embodiment of the present invention.

FIG. 4 is a schematic configuration diagram illustrating a BOG treatment system for a vessel according to a third embodiment of the present invention.

Although FIG. 4 illustrates an example in which the BOG treatment system of the present invention is applied to an LNG carrier equipped with a DF engine capable of using natural gas as fuel (that is, a propulsion system, for example, a DFDE propulsion system, which uses LNG as fuel), the BOG treatment system (that is, BOG partial reliquefaction system) of the present invention can also be applied to any type of vessels (LNG carrier, LNG RV, and the like) and marine plants (FSPP, BMPP, LNG FRU, LNG FPSO, LNG FSRU, and the like), in which a liquefied gas storage tank is installed.

In the BOG treatment system for the vessel according to the third embodiment of the present invention, boil-off gas (NBOG) generated and discharged from a storage tank 11 storing liquefied gas is transferred along a BOG supply line L1 and is then supplied to the compressor 13. The compressor 13 may be a multi-stage compressor. As described below, the BOG being multi-stage compressed in the compressor 13 may be compressed to about 7 bara. Then, the BOG may be branched in the middle stage (that is, step prior to the final compression step) and be then supplied to a demander, that is, a propulsion system (for example, DFDE) using LNG as fuel, along a fuel supply line L2. The BOG remaining after being supplied to the DFDE may be compressed to a high pressure of about 100 to 400 bara by the compressor. Then, as described below, the BOG may be liquefied while moving along a BOG return line L3 and be then returned to the storage tank 11.

The storage tank has sealing and heat-insulating walls so as to store liquefied gas such as LNG in a cryogenic state, but cannot perfectly block heat transferred from the outside. Therefore, the liquefied gas is continuously vaporized within the storage tank 11, and BOG inside the storage tank 11 is discharged through the BOG discharge line L1 so as to maintain the pressure of the BOG at an appropriate level.

A discharge pump 12 is installed within the storage tank 11 so as to discharge LNG to the outside of the storage tank when necessary. Although not illustrated in FIG. 4, when an amount of BOG discharged from the storage tank 11 is smaller than an amount of fuel required in the DFDE, BOG may be generated by discharging LNG by the discharge pump 12 and then forcibly vaporizing the LNG, and the generated BOG may be supplied to the compressor 13 through the BOG supply line L1.

The compressor 13 may include one or more compression cylinders 14 and one or more intercoolers 15 for cooling BOG of which the temperature is raised while being compressed. The compressor 13 may be configured to compress BOG to, for example, about 400 bara. Although FIG. 4 illustrates the reciprocating type multi-stage compressor 13 including five compression cylinders 14 and five intercoolers 15, the number of the compression cylinders and the number of the intercoolers may be changed when necessary. In addition, a plurality of compression cylinders may be arranged within a single compressor, and a plurality of compressors may be connected in series.

The BOG compressed at the middle stage of the compressor 13, for example, the 2-stage compressed BOG is compressed to about 7 bara and is branched and supplied through the fuel supply line L2 to a consumer, for example, a DF engine (that is, DFDE). All or part of the BOG may be supplied according to an amount of fuel required for the engine.

That is, according to the third embodiment of the present invention, when BOG discharged from the storage tank 11 and supplied to the compressor 13 (that is, all BOG discharged from the storage tank) is a first stream, the first stream of the BOG may be divided into a second stream and a third stream within the compressor 13. The second stream may be supplied as fuel to the DF engine (that is, DFDE), and the third stream may be liquefied and returned to the storage tank.

At this time, the second stream is supplied to the DFDE through the fuel supply line L2, and the third stream is returned to the storage tank 11 through the BOG return line L3. A heat exchanger 21 is installed in the BOG return line L3 so as to liquefy the third stream of the compressed BOG. The heat exchanger 21 exchanges heat between the third stream of the compressed BOG and the first stream of the BOG discharged from the storage tank 11 and supplied to the compressor 13.

Since a flow rate of the first stream of the BOG before compression is larger than a flow rate of the third stream, the third stream of the compressed BOG may be cooled (that is, at least partially liquefied) by receiving cold energy from the first stream of the BOG before compression. As such, in the heat exchanger 21, the BOG of the high pressure state is cooled (liquefied) by heat exchange between the BOG of the cryogenic temperature immediately after being discharged from the storage tank 11 and the BOG of the high pressure state compressed in the compressor 13.

The LBOG cooled in the heat exchanger 21 is decompressed while passing through decompressing means 22 (for example, J-T valve or expander), and is supplied to a gas-liquid separator 23 in a gas-liquid mixed state. The LBOG may be decompressed to approximately atmospheric pressure (for example, decompressed from 300 bar to 3 bar) while passing through the expansion means 22. The liquefied BOG is separated into gas and liquid components in the gas-liquid separator 23. The liquid component, that is, LNG, is transferred to the storage tank 11 through the BOG return line L3, and the gas component, that is, BOG, is discharged through a BOG recirculation line L5 and is joined with BOG discharged from the storage tank 11 and supplied to the compressor 13. More specifically, the BOG recirculation line L5 extends from an upper end of the gas-liquid separator 23 and is connected to a more upstream side than the heat exchanger 21 in the BOG supply line L1.

For convenience of explanation, it has been described that the heat exchanger 21 is installed in the BOG return line L3, but the heat exchanger 21 may be installed in the BOG supply line L1 because the heat exchange is actually performed between the first stream of the BOG transferred through the BOG supply line L1 and the third stream of the BOG transferred through the BOG return line L3.

Another expansion means 24 (for example, J-T valve or expander, hereinafter referred to as a "second expansion means 24") may be further installed in the BOG recirculation line L5. Therefore, the gas component discharged from the gas-liquid separator 23 may be decompressed while passing through the second expansion means 24. The second expansion means 24 may be used to adjust an internal pressure of the gas-liquid separator 23 and may maintain the pressure of the natural gas of the liquid state returned from the gas-liquid separator 23 to the storage tank 11 at a pressure finely higher than the internal pressure of the storage tank. In addition, the second expansion means 24 adjusts the pressure of the downstream side of the second expansion means 24 in the BOG recirculation line L5, such that the natural gas of the gas state can be smoothly joined with the BOG transferred along the BOG supply line L1.

In addition, a cooler 25 is installed in the BOG recirculation line L5 so as to further cool the third stream by heat exchange between the third stream of the BOG liquefied in the heat exchanger 21 and supplied to the gas-liquid separator 23 and the gas component separated in the gas-liquid separator 23 and transferred through the BOG recirculation line L5. That is, the cooler 25 additionally cools the BOG of a high pressure liquid state with natural gas of a low pressure cryogenic gas state.

For convenience of explanation, it has been described that the cooler 25 is installed in the BOG recirculation line L5, but the cooler 25 may be installed in the BOG return line L3 because the heat exchange is actually performed between the third stream of the BOG transferred through the BOG return line L3 and the gas component transferred through the BOG recirculation line L5.

Meanwhile, when it is expected that surplus BOG will be generated because an amount of BOG generated in the storage tank 11 is larger than an amount of fuel necessary for the DF engine (for example, during engine stop or low speed sailing), BOG being compressed stepwise in the compressor 13 is branched through the BOG branch lines L7 and is then used in BOG consuming means. Examples of the BOG consuming means may include a GCU and a gas turbine, each of which can use natural gas as fuel.

As described above, in the BOG treatment system and method according to the third embodiment of the present invention, BOG generated during the transportation of cargo (that is, LNG) in the LNG carrier may be used as the fuel of the engine, or may be reliquefied, be returned to the storage tank, and be stored therein. Therefore, an amount of BOG consumed in the GCU or the like can be reduced or removed. Furthermore, BOG can be treated by reliquefaction, without installing reliquefaction apparatuses using separate refrigerants such as nitrogen.

In addition, in the BOG treatment system and method according to the third embodiment of the present invention, since it is unnecessary to install the reliquefaction apparatuses using separate refrigerants (that is, nitrogen-refrigerant refrigeration cycle, mixed-refrigerant refrigeration cycle, or the like), facilities for supplying and storing the refrigerants need not be separately installed. Consequently, it is possible to save initial installation cost and operation cost for configuring the entire system.

Figure 5:
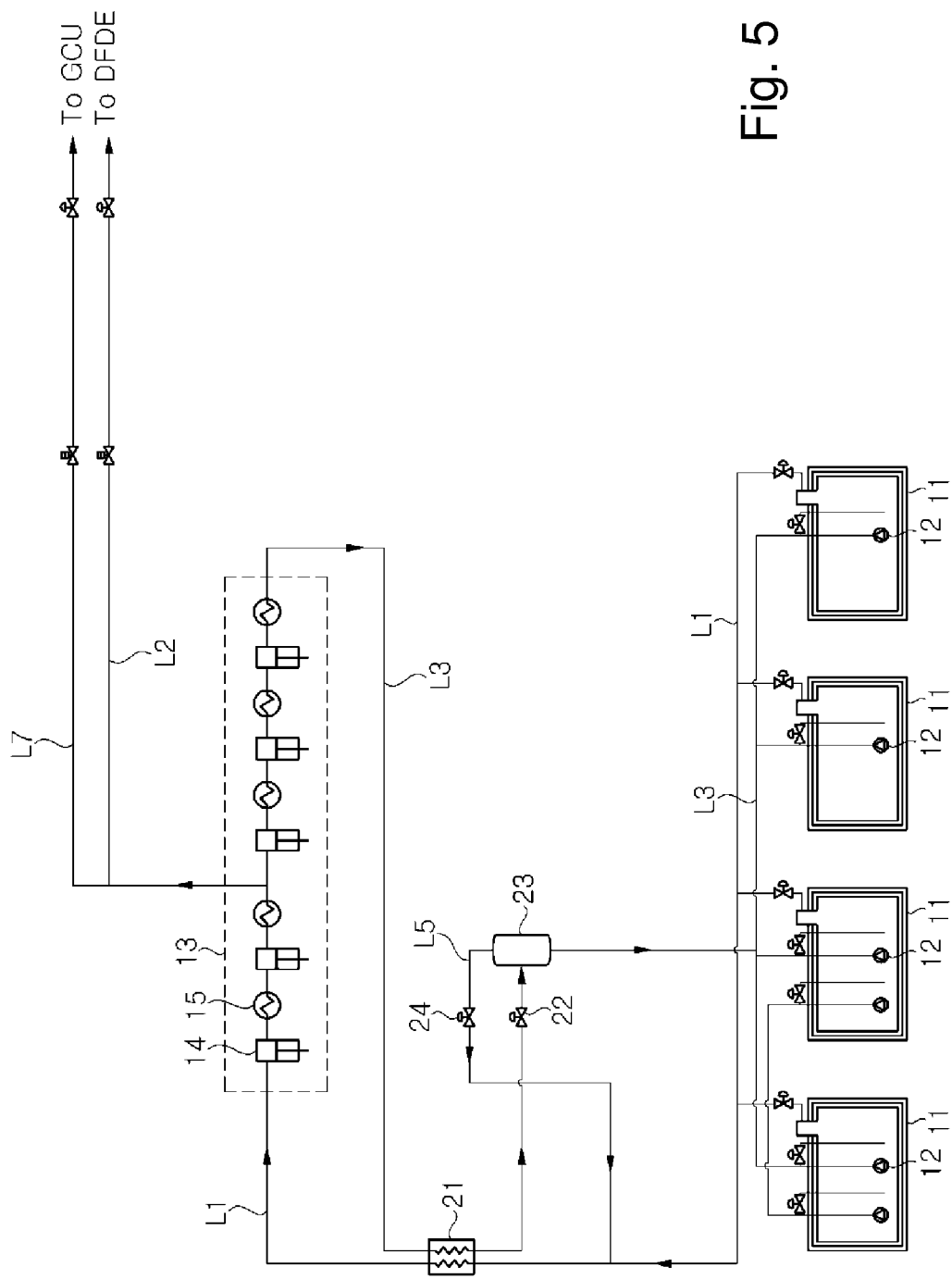
FIG. 5 is a schematic configuration diagram illustrating a BOG treatment system for a vessel according to a fourth embodiment of the present invention.

FIG. 5 is a schematic configuration diagram illustrating a BOG treatment system for a vessel according to a fourth embodiment of the present invention.

The BOG treatment system according to the fourth embodiment differs from the BOG treatment system according to the third embodiment in that the cooler 25 is not installed. Therefore, the same reference numerals are assigned to the same elements as those of the third embodiment, and a detailed description thereof will be omitted. If the cooler 25 is not installed, the total efficiency of the system may be slightly lowered. However, the pipe arrangement and the system operation may be facilitated, and the initial installation cost and the maintenance fee may be reduced.

Meanwhile, although not illustrated, when an amount of BOG required for the DF engine (DFDE) is larger than an amount of BOG naturally generated, the system may be configured such that LNG is forcibly vaporized and then used. To this end, a forcible vaporization line (not illustrated) is configured such that, after LNG stored in the storage tank 11 is discharged by the discharge pump 12, the LNG can be vaporized in a forcible vaporizer (not illustrated) and be then supplied to the compressor 13. If the forcible vaporization line is installed, the fuel can be stably supplied even when an amount of LNG stored in the storage tank is small and thus a generation amount of BOG is small, or even when an amount of BOG required as fuel in various engines is larger than an amount of BOG generated naturally.

In addition, FIGS. 1 to 5 illustrate that the compressor 13 performs 5-stage compression, but this is merely exemplary. As an example of the compressor 13, a compressor manufactured by Burckhardt company may be used. The compressor manufactured by Burckhardt company includes five cylinders. It is known that the three cylinders of the front stage are operated in an oil-free-lubricated method and two cylinders of the rear stage are operated in an oil-lubricated method. Therefore, in the case where the compressor manufactured by Burckhardt company is used as the compressor 13 for compressing BOG, the BOG needs to be transferred through an oil filter when the BOG is branched at 4-stage or more of the compressor. However, it is advantageous in that the oil filter need not be used when the BOG is branched at 3-stage or less of the compressor.

According to the present embodiment, in spite of the recent trend in which the generation amount of BOG is increased due to the increased capacity of the storage tank and a necessary amount of fuel is reduced due to the improved performance of the engine, the BOG remaining after being used as the fuel of the engine can be reliquefied and returned to the storage tank, thereby preventing the waste of BOG.

In the third and fourth embodiments, it has been described that the consumer receiving the BOG branched from the middle stage while being multi-stage compressed in the compressor is a propulsion system using natural gas as fuel, and an example of the propulsion system is the DFDE. However, it is obvious that the present invention can also be applied to another propulsion system using natural gas (LNG) as fuel, as well as the DFDE.

Figure 6:
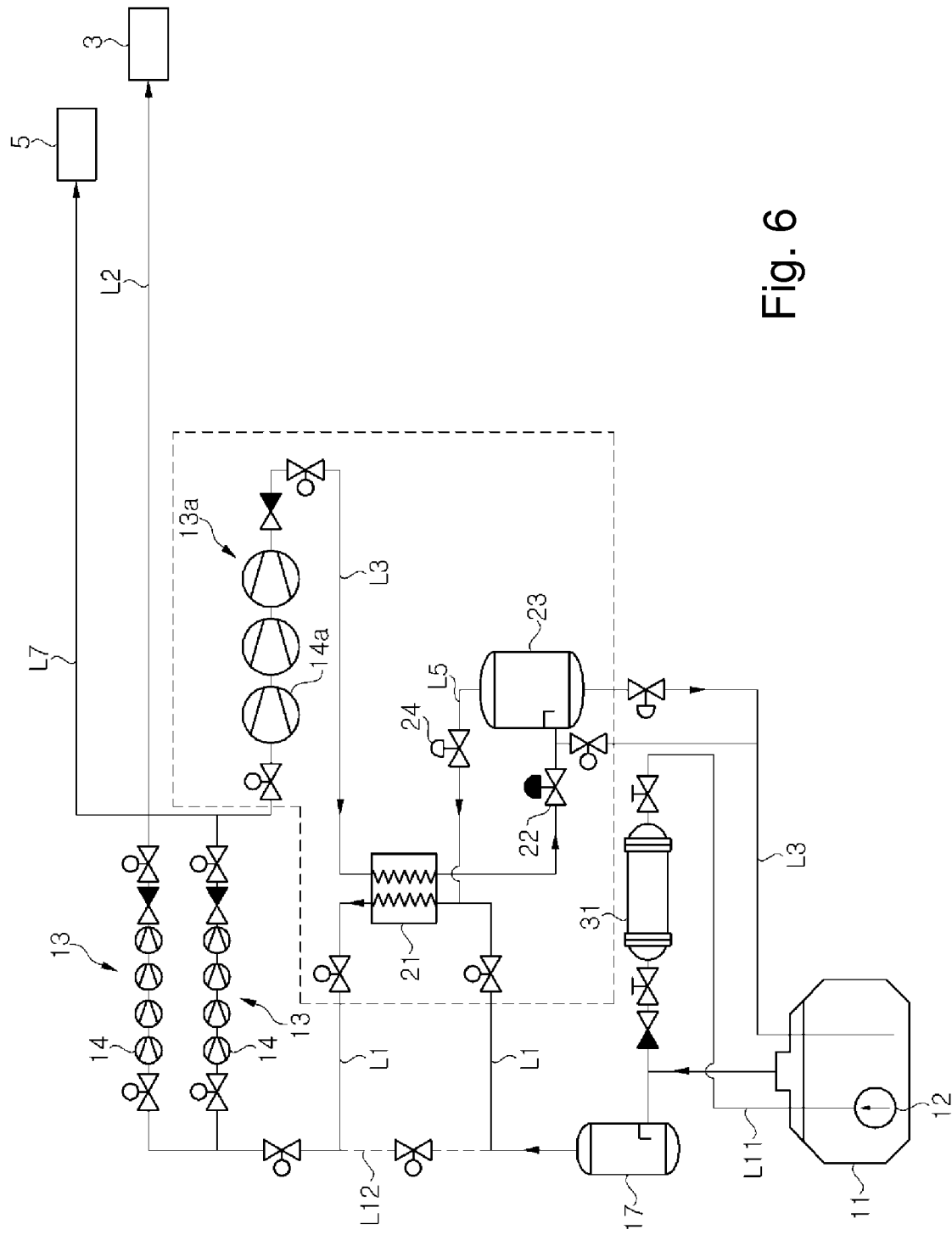
FIG. 6 is a schematic configuration diagram illustrating a BOG treatment system for a vessel according to a fifth embodiment of the present invention.

FIG. 6 is a schematic configuration diagram illustrating a BOG treatment system for a vessel according to a fifth embodiment of the present invention.

FIG. 6 illustrates an example in which the BOG treatment system of the present invention is applied to an LNG carrier equipped with a DF engine capable of using natural gas as fuel (that is, a propulsion system using LNG solely or a mixture of LNG and oil as fuel, for example, a DFDE propulsion system that uses electricity generated in a DFDG and propels through a motor). However, the BOG treatment system (that is, BOG partial reliquefaction system) of the present invention can also be applied to any type of vessels (LNG carrier, LNG RV, and the like) and marine plants (FSPP, BMPP, LNG FRU, LNG FPSO, LNG FSRU, and the like), in which a liquefied gas storage tank is installed.

In addition, in the present embodiment, it has been described that the consumer receiving the BOG compressed in the compressor is a propulsion system using natural gas as fuel, and an example of the propulsion system is a DFDE (for example, 4-stroke engine (DFDE) manufactured by Wartsila company). However, it is obvious that the present invention can also be applied to another propulsion system (for example, 2-stroke engine (W5X72) manufactured by Wartsila company) using natural gas (LNG) solely or a mixture of LNG and oil as fuel, as well as the DFDE. In the following description, an engine (heterogeneous fuel engine) capable of using natural gas compressed at a pressure of about 5 to 20 bar alone or a mixture of the gas and oil as fuel will be referred to as "medium pressure gas engine (medium pressure heterogeneous fuel engine). In this specification, the term "medium pressure" should be considered as meaning a pressure of about 5 to 20 bar at which the BOG as the fuel supplied to the engine is compressed.

In the BOG treatment system for the vessel according to the fifth embodiment of the present invention, boil-off gas (NBOG) generated and discharged from a storage tank 11 storing liquefied gas is transferred along a BOG supply line L1 and is then supplied to the compressor 13. The compressor 13 may be a multi-stage compressor. As described below, the BOG may be compressed to about 5 to 20 bara, preferably about 6 to 12 bar, and more preferably about 6 to 7 bar, in the compressor. Then, the compressed BOG may be supplied to a demander, that is, a propulsion system using LNG as fuel, for example, a DFDE 3 (medium pressure as engine), along a fuel supply line L2. The compressor 13 may be a centrifugal type multi-stage compressor. Although the compressor is illustrated as 4-stage, the compressor may be 3-stage or less or may be 5-stage or more. A pair of compressors 13 may be installed in parallel so as to satisfy redundancy requirements.

When all BOG generated in the storage tank is not consumed in the DFDE 3, BOG that is not supplied to the DFDE 3 may be compressed by a booster compressor 13a at a pressure of about 80 to 250 bar, preferably about 100 to 200 bar, and more preferably about 120 to 160 bar. Then, as described below, the BOG may be liquefied while moving along the BOG return line L3 and be then returned to the storage tank 11. The booster compressor 13a may be a reciprocating type multi-stage compressor. Although the booster compressor 13a is illustrated in FIG. 6 as 3-stage, the booster compressor 13a may be 2-stage or less or may be 4-stage or more.

According to the present invention, the BOG is compressed at a pressure of about 80 to 250 bar and is then cooled and liquefied by heat exchange in the heat exchanger 21. In order to cool and liquefy the compressed BOG by heat exchange with the cryogenic BOG discharged from the storage tank, it is necessary to compress the BOG at high pressure. In this specification, the term "high pressure" should be considered as meaning a pressure of about 80 to 250 bar at which the BOG compressed without separate reliquefaction apparatus using a refrigeration cycle of nitrogen or the like can be liquefied by heat exchange with the BOG discharged from the storage tank. When the pressure of the compressed BOG is 80 bar or lower, it is difficult to liquefy the compressed BOG by only the heat exchange with the BOG discharged from the storage tank, without separate reliquefaction apparatus having a refrigeration cycle.

The storage tank has sealing and heat-insulating walls so as to store liquefied gas such as LNG in a cryogenic state, but cannot perfectly block heat transferred from the outside. Therefore, the liquefied gas is continuously vaporized within the storage tank 11, and BOG inside the storage tank 11 is discharged through the BOG discharge line L1 so as to maintain the pressure of the BOG at an appropriate level.

A discharge pump 12 is installed within the storage tank 11 so as to discharge LNG to the outside of the storage tank 11 when necessary. The discharge pump 12 may be installed inside the storage tank 11 as illustrated in FIG. 6, or may be installed outside the storage tank 11.

A forcible vaporization line L11 is provided such that, when an amount of BOG discharged from the storage tank 11 is smaller than an amount of fuel required as fuel in the DFDE, LNG can be discharged by the discharge pump 12, be vaporized in a forcible vaporizer 31, and be then supplied to the compressor 13.

When the forcible vaporization line L11 equipped with the forcible vaporizer 31 is provided, fuel can be stably supplied even when a small amount of BOG is generated because a small amount of LNG is stored in the storage tank 11 in a ballast condition, or even when an amount of BOG required as fuel in the engine is larger than an amount of BOG generated naturally.

The forcibly vaporized BOG may be supplied to the compressor 13 through the BOG supply line L1.

A mist separator 17 may be installed in the BOG supply line L1 so as to remove fine droplet that may be contained in the BOG.

The compressor 13 may include one or more centrifugal type compression devices 14 and one or more intercoolers (not illustrated) for cooling BOG of which the temperature is raised during compression. The compressor 13 may be configured to compress BOG to 6 to 12 bar, preferably 6 to 7 bar. Although FIG. 6 illustrates the centrifugal type multi-stage compressor 13 including four centrifugal type compression devices 14, the number of the compression devices and the number of the intercoolers may be changed when necessary. In addition, a plurality of compression devices may be arranged within a single compressor, and a plurality of compressors may be connected in series.

The booster compressor 13a may include one or more reciprocating type compression devices 14a and one or more intercoolers (not illustrated) for cooling BOG of which the temperature is raised during compression. If a pressure of the BOG compressed by the booster compressor 13a is high, the reliquefaction efficiency may be increased. However, at the same time, energy consumption for compressing the BOG may be highly increased and large capacity for compressing the BOG may be required. Therefore, the booster compressor 13a may be configured to compress BOG to 80 to 250 bar, preferably 100 to 200 bar, more preferably 12 to 160 bar. Although FIG. 6 illustrates the reciprocating type multi-stage compressor 13a including three reciprocating type compression devices 14a, the number of the compression devices and the number of the intercoolers may be changed when necessary. In addition, a plurality of compression devices may be arranged within a single compressor, and a plurality of compressors may be connected in series.

As in the compressor 13, a pair of booster compressors 13a may be installed in parallel for redundancy design.

Instead of arranging the compressor 13 and the booster compressor 13a in a row as illustrated in FIG. 6, a compressor for the DFDE 3 alone and a compressor for reliquefaction may be arranged in separate lines. However, a case where the compressor 13 for supplying the fuel to the vessel engine and the booster compressor 13a for reliquefaction are arranged in a row is advantage because the BOG primarily compressed (about 6 to 7 bar) in the compressor 13 can be used. Alternatively, as illustrated in FIGS. 1 to 5, one multi-stage compressor may be installed and the BOG may be branched during multi-stage compression.

The BOG compressed in the compressor 13 is compressed to about 7 bara and is supplied through the fuel supply line L2 to a consumer, for example, a DF engine (that is, DFDE 3). All or part of the BOG may be supplied according to an amount of fuel required for the engine.

That is, according to the fifth embodiment of the present invention, when BOG discharged from the storage tank 11 and supplied to the compressor 13 (that is, all BOG discharged from the storage tank) is a first stream, the first stream of the BOG may be divided into a second stream and a third stream at the downstream side of the compressor 13. The second stream may be supplied as fuel to the DF engine (that is, DFDE 3), and the third stream may be liquefied and returned to the storage tank 11.

At this time, the second stream is supplied to the DFDE 3 through the fuel supply line L2, and the third stream is returned to the storage tank 11 through the BOG return line L3. A heat exchanger (for example, DCHE) 21 is installed in the BOG return line L3 so as to liquefy the third stream of the compressed BOG. The heat exchanger 21 exchanges heat between the third stream of the compressed BOG and the first stream of the BOG discharged from the storage tank 11 and supplied to the compressor 13.

Since a flow rate of the first stream of the BOG before compression is larger than a flow rate of the third stream, the third stream of the compressed BOG may be cooled (that is, at least partially liquefied) by receiving cold energy from the first stream of the BOG before compression. As such, in the heat exchanger 21, the BOG of the high pressure state is cooled (liquefied) by heat exchange between the BOG of the cryogenic temperature immediately after being discharged from the storage tank 11 and the BOG of the high pressure state compressed in the compressor 13.

A bypass line L12 may be installed such that when there is no BOG to be reliquefied, that is, when the flow rate of the first stream is equal to the flow rate of the second stream, the BOG discharged from the storage tank 11 is bypassed without passing through the heat exchanger 21 and is directly supplied to the compressor 13.

Although there is a difference according to a propulsion speed (that is, load of the DFDE 3) or a generation amount of the BOG, it is general that about 30 to 70% of the BOG generated in the storage tank is used as the fuel of the vessel engine and the other is reliquefied.

The LBOG cooled in the heat exchanger 21 is decompressed while passing through decompressing means 22 (for example, J-T valve or expander, hereinafter, referred to as a "first expansion means 22"), and is continuously supplied to a gas-liquid separator 23 in a gas-liquid mixed state. The LBOG may be decompressed to approximately atmospheric pressure (for example, decompressed from 300 bar to 3 bar) while passing through the first expansion means 22. The liquefied BOG is separated into gas and liquid components in the gas-liquid separator 23. The liquid component, that is, LNG, is transferred to the storage tank 11 through a BOG return line L3, and the gas component, that is, BOG, is transferred through a BOG recirculation line L5 and is joined with BOG discharged from the storage tank 11 and supplied to the compressor 13. More specifically, the BOG recirculation line L5 extends from an upper end of the gas-liquid separator 23 and is connected to a more upstream side than the heat exchanger 21 in the BOG supply line L1.

For convenience of explanation, it has been described that the heat exchanger 21 is installed in the BOG return line L3, but the heat exchanger 21 may be installed in the BOG supply line L1 because the heat exchange is actually performed between the first stream of the BOG transferred through the BOG supply line L1 and the third stream of the BOG transferred through the BOG return line L3.

Another expansion means 24 (for example, J-T valve or expander, hereinafter referred to as a "second expansion means 24") may be further installed in the BOG recirculation line L5. Therefore, the gas component discharged from the gas-liquid separator 23 may be decompressed while passing through the second expansion means 24. The second expansion means 24 may be used to adjust an internal pressure of the gas-liquid separator 23 and may maintain the pressure of the natural gas of the liquid state returned from the gas-liquid separator 23 to the storage tank 11 at a pressure finely higher than the internal pressure of the storage tank. In addition, the second expansion means 24 adjusts the pressure of the downstream side of the second expansion means 24 in the BOG recirculation line L5, such that the natural gas of the liquid state can be smoothly joined with the BOG transferred along the BOG supply line L1.

In addition, a cooler (not illustrated) is installed in the BOG recirculation line L5 so as to further cool the third stream by heat exchange between the third stream of the BOG liquefied in the heat exchanger 21 and supplied to the gas-liquid separator 23 and the gas component separated in the gas-liquid separator 23 and transferred through the BOG recirculation line L5. That is, the cooler additionally cools the BOG of a high pressure liquid state with natural gas of a low pressure cryogenic gas state.

Meanwhile, when it is expected that surplus BOG will be generated because an amount of BOG generated in the storage tank 11 is larger than an amount of fuel necessary for the DF engine (that is, DFDE 3) (for example, during engine stop or low speed sailing), BOG compressed in the compressor 13 is branched through the BOG branch line and is used in a BOG consuming means 5. Examples of the BOG consuming means may include an integrated inert gas generator (IGG)/gas combustion unit (GCU) system, a GCU, a gas turbine, and a boiler, each of which can use natural gas as fuel.

The integrated IGG/GCU system is an apparatus in which the IGG and the GCU are integrated.

As described above, in the BOG treatment system and method according to the fifth embodiment of the present invention, BOG generated during the transportation of cargo (that is, LNG) in the LNG carrier may be used as the fuel of the engine, or may be reliquefied, be returned to the storage tank, and be stored therein. Therefore, an amount of BOG consumed in the GCU or the like can be reduced or removed. Furthermore, BOG can be treated by reliquefaction, without installing reliquefaction apparatuses using separate refrigerants such as nitrogen.

In addition, in the BOG treatment system and method according to the fifth embodiment of the present invention, since it is unnecessary to install the reliquefaction apparatuses using separate refrigerants (that is, nitrogen-refrigerant refrigeration cycle, mixed-refrigerant refrigeration cycle, or the like), facilities for supplying and storing the refrigerants need not be separately installed. Consequently, it is possible to save initial installation cost and operation cost for configuring the entire system.

According to the present invention, in spite of the recent trend that the generation amount of BOG is increased due to the increased capacity of the storage tank and a necessary amount of fuel is reduced due to the improved performance of the engine, the BOG remaining after being used as the fuel of the engine can be reliquefied and returned to the storage tank, thereby preventing the waste of BOG.

A vessel, such as an LNG carrier or an LNG RV, is used to transport LNG from a producing area to a consumer. Therefore, when sailing from the producing area to the consumer, the vessel sails in a laden condition in which the LNG is fully loaded into the storage tank. When returning to the producing area after unloading the LNG, the vessel sails in a ballast condition in which the storage tank is almost empty. In the laden condition, a large amount of BOG is generated because an amount of LNG is relatively large. In the ballast condition, a relatively small amount of BOG is generated because an amount of LNG is small.

Although there is a difference according to the capacity of the storage tank, outside temperature, and the like, an amount of BOG generated when the capacity of the LNG storage tank is about 130,000 to 350,000 is about 3 to 4 ton/h in the laden condition and is about 0.3 to 0.4 ton/h in the ballast condition. In addition, an amount of fuel gas necessary for the main engine (propulsion system) of the vessel is about 1 to 4 ton/h (about 1.5 ton/h on average). Meanwhile, in recent years, since a boil-off rate (BOR) has tended to be lowered due to the improvement in the heat insulation performance of the storage tank, a generation amount of BOG has tended to be reduced.

In the laden condition in which a generation amount of BOG is large, a part of BOG compressed through the compressor 13 may be supplied to the vessel engine (that is, DFDE 3), and the remaining part of the BOG that is not supplied to the vessel engine may be further compressed through the booster compressor 13*a* and be supplied to and reliquefied in the heat exchanger 21.

In addition, in the ballast condition in which a generation amount of BOG is small, LNG inside the storage tank 11 may be supplied to the compressor 13 through the discharge pump 12 and the forcible evaporator 31 according to an amount of fuel required for the vessel engine, be compressed in the compressor 13, and be supplied to the DFDE 3.

As such, in the ballast condition in which the generation amount of BOG is smaller than the amount of fuel required for the engine, the system may be operated to treat all BOG through the DFDE 3.

Meanwhile, since a generation amount of BOG is small in the ballast condition, BOG is not discharged but accumulated until the storage tank reaches a predetermined pressure, and is intermittently discharged and supplied as fuel to the DFDE engine, instead of discharging and consuming BOG whenever the BOG is generated.

In addition, the BOG treatment system according to the present embodiment can be applied to the already built vessels as well as newly designed vessels. For example, in the case of the vessel equipped with the line for supplying the BOG from the LNG storage tank through the compressor to the DFDE, the present embodiment can be applied through modification by adding the booster compressor 13a, the BOG return line L3, the heat exchanger 21, the first expansion means 22, the gas-liquid separator 23, the BOG recirculation line L5, and the second expansion means 24 as described above with reference to FIG. 6.

While the embodiments of the present invention have been described with reference to the embodiments, it will be apparent to those skilled in the art that various changes and modifications may be made without departing from the spirit and scope of the invention as defined in the following claims.

What is claimed is:

1. A method of processing liquefied natural gas (LNG) in a vessel, the method comprising:
    providing a vessel comprising:
        an LNG tank containing LNG and boil-off gas (BOG) of the LNG,
        a gas fuel engine configured to consume a pressurized gas composition,
        a first gas-to-gas pathway configured to process a gas composition comprising BOG to generate the pressurized gas composition for sending to the gas fuel engine, wherein the first gas-to-gas pathway comprises a heat exchanger and a bypass line bypassing the heat exchanger,
        a gas-to-liquid pathway configured to liquefy a portion of the pressurized gas composition for returning to the LNG tank,
        a second gas-to-gas pathway configured to send a gas phase generated in the gas-to-liquid pathway to the first gas-to-gas pathway, and
        a liquid-to-gas pathway configured to process LNG from the LNG tank to supply a vaporized composition to the first gas-to-gas pathway; and
    running one or more of the first gas-to-gas pathway, the gas-to-liquid pathway, the second gas-to-gas pathway, and the liquid-to-gas pathway,
    wherein, when BOG discharged from the LNG tank exceeds an amount of the pressurized gas composition required at the gas fuel engine, the method runs the first gas-to-gas pathway with the heat exchanger, the gas-to-liquid pathway, and the second gas-to-gas pathway,
    wherein running the first gas-to-gas pathway comprises:
        discharging BOG from the LNG tank,
        heating the gas composition comprising the discharged BOG at the heat exchanger,
        pressurizing the heated gas composition at a first multi-stage compressor to generate the pressurized gas composition having a pressure of 5-20 bara, and
        supplying part of the pressurized gas composition to the gas fuel engine;
    wherein running the gas-to-liquid pathway comprises:
        branching off a stream of the pressurized gas composition between the first multi-stage compressor and the gas fuel engine,
        further pressurizing the pressurized gas composition at a second multi-stage compressor to generate a supercritical state LNG composition having a pressure of 80-400 bara,
        cooling the supercritical state composition at the heat exchanger to generate a cooled composition by heat-exchanging with the gas composition of the first gas-to-gas pathway,
        depressurizing the cooled composition at a depressurizer to generate depressurized composition that comprises a liquid-gas mixture,
        generating a liquid phase and the gas phase from the liquid-gas mixture at a liquid-gas separator, and
        returning the liquid phase to the LNG tank;
    wherein running the second gas-to-gas pathway comprises sending the gas phase from the liquid-gas separator to the first gas-to-gas pathway for adding to the discharged BOG to provide the gas composition in the first gas-to-gas pathway between the LNG tank and the heat exchanger such that the gas composition is heated by heat-exchanging with the supercritical state composition at the heat exchanger;
    wherein, when the discharged BOG from the LNG tank is smaller than an amount of the pressurized gas composition required at the gas fuel engine, the method does not run the gas-to-liquid pathway, runs the liquid-to-gas pathway, and runs the first gas-to-gas pathway with the bypass line in which the heat exchanger is bypassed via the bypass line such that the gas composition comprising the discharged BOG from the LNG tank bypasses the heat exchanger and is pressurized at the first multi-stage compressor to generate the pressurized gas composition having a pressure of 5-20 bara,
    wherein running the liquid-to-gas pathway comprises:
        discharging a portion of the LNG from the LNG tank,
        vaporizing the discharged portion of the LNG at a vaporizer to generate the vaporized composition, and
        sending the vaporized composition to the first gas-to-gas pathway, in which the vaporized composition is added to the discharged BOG to provide the gas composition such that the gas composition comprising the vaporized composition from the liquid-to-gas pathway bypasses the heat exchanger before the first multi-stage compressor in the first gas-to-gas pathway.

2. The method of claim 1, wherein the first multi-stage compressor comprises a plurality of compressing units that are serially connected, wherein the second multi-stage compressor comprises a plurality of compressing units that are serially connected.

3. The method of claim 1, wherein the vessel further comprises a third multi-stage compressor, wherein the first and third multi-stage compressors are arranged in parallel in the first gas-to-gas pathway for redundancy.

4. The method of claim 1, wherein the vessel does not comprise a refrigeration cycle of a nitrogen coolant for cooling the supercritical state LNG in the gas-to-liquid pathway.

* * * * *